(12) United States Patent
Murosaki

(10) Patent No.: US 8,575,581 B2
(45) Date of Patent: Nov. 5, 2013

(54) IMAGE READING APPARATUS

(75) Inventor: Mikio Murosaki, Ishikawa (JP)

(73) Assignee: PFU Limited, Ishikawa (JP)

( * ) Notice: Subject to any disclaimer, the term of this patent is extended or adjusted under 35 U.S.C. 154(b) by 357 days.

(21) Appl. No.: 12/890,155

(22) Filed: Sep. 24, 2010

(65) Prior Publication Data

US 2011/0253916 A1 Oct. 20, 2011

(30) Foreign Application Priority Data

Apr. 20, 2010 (JP) ................. 2010-097410

(51) Int. Cl.
*G01N 21/86* (2006.01)

(52) U.S. Cl.
USPC ............ 250/559.07; 250/559.01; 250/559.03; 250/559.11; 250/559.15; 356/622; 358/484; 358/498

(58) Field of Classification Search
USPC ......... 250/559.01, 559.07; 356/622; 358/484, 358/498, 508; 362/326; 347/4
See application file for complete search history.

(56) References Cited

U.S. PATENT DOCUMENTS

| | | | | |
|---|---|---|---|---|
| 5,144,286 A | * | 9/1992 | Rollins | 340/635 |
| 5,396,078 A | * | 3/1995 | Klaus et al. | 250/551 |
| 6,335,978 B1 | * | 1/2002 | Moscato et al. | 382/112 |
| 2001/0021297 A1 | * | 9/2001 | Akira | 385/116 |
| 2013/0043415 A1 | * | 2/2013 | Misao | 250/559.15 |

FOREIGN PATENT DOCUMENTS

| | | |
|---|---|---|
| CN | 101045374 | 10/2007 |
| JP | 04-211563 A | 8/1992 |
| JP | 04-276980 A | 10/1992 |
| JP | 06-181502 A | 6/1994 |
| JP | 07-221934 A | 8/1995 |
| JP | 08-137334 A | 5/1996 |
| JP | 2005-075591 A | 3/2005 |

OTHER PUBLICATIONS

Office Action for Chinese patent application No. 201010581780.5 dated Jun. 28, 2013.

* cited by examiner

*Primary Examiner* — Georgia Y Epps
*Assistant Examiner* — Kevin Wyatt
(74) *Attorney, Agent, or Firm* — Lowe, Hauptman & Ham

(57) ABSTRACT

An apparatus includes: a body including a port into which a medium is insertable; a light source that is provided in the body and illuminates when an image is read for the medium that has been inserted into the port; a guide and output unit that is optically connected to the light source, guides light emitted from the light source, and outputs the guided light into the port; a receiver that detects the output light; and a determiner that determines whether the medium has been inserted into the port based on a result of the detection. The light source also illuminates when the determiner makes the determination. A region in the port through which the light output from the light guide and output unit passes exists from one end to the other end of the port in a width direction being a longitudinal direction of the port.

9 Claims, 10 Drawing Sheets

IMAGE READING APPARATUS

CROSS-REFERENCE TO RELATED APPLICATIONS

This application is based upon and claims the benefit of priority from Japanese Patent Application No. 2010-097410, filed on Apr. 20, 2010, the entire contents of which are incorporated herein by reference.

BACKGROUND OF THE INVENTION

1. Field of the Invention

The present invention relates to an image reading apparatus that picks up an image of a sheet medium being conveyed while conveying the sheet medium.

2. Description of the Related Art

Conventionally, image reading apparatuses that pick up an image of a sheet medium being conveyed while conveying the sheet medium have been proposed. In such an image reading apparatus, a sheet medium, when inserted into an insertion port of an apparatus body, is conveyed to an imaging device by a conveying roller, imaged by the imaging device, and discharged from the apparatus body by the conveying roller.

Generally, a sensor that detects the sheet medium inserted into the insertion port is provided in the image reading apparatus, and when this sensor detects the sheet medium, conveyance to the imaging device by the conveying roller and imaging by the imaging device are performed with respect to the sheet medium that has been inserted into the insertion port.

As a technique relating to the detection of the sheet medium, a paper feeding device that detects an original by a sensor provided between a paper placing portion and a sheet conveyance path has been proposed (Japanese Patent No. 4300943).

In the paper feeding device of Japanese Patent No. 4300943, a plurality of sensors are arranged separately from each other in a width direction on, for example, an original feed port of an original placing portion. In each sensor, a paper-side filler piece and a sensor filler are swingably supported via a spindle with respect to a photoelectric sensor. In each sensor, when the sheet-side filler piece acts on an original brought out from the original placing portion by a pick-up roller, the sheet-side filler piece and the sensor filler swing, so that the photoelectric sensor receives light from a light emitting unit, which has been blocked by the sensor filler, to detect the original. That is, the paper feeding device in Japanese Patent No. 4300943 detects the width of the original based on output results of the sensors arranged separately from each other in the width direction.

Generally, in image reading apparatuses, to detect a sheet medium that has been inserted into the insertion port or to detect whether the sheet medium has been placed on a paper tray, a plurality of sensors are installed along the width direction or a sensor having a plurality of arms like the sheet-side filler pieces in the paper feeding device in Japanese Patent No. 4300943 is installed, for example.

In these sensors, because the number of parts increases and the structures thereof become complicated, the apparatuses become large-sized and the costs of the apparatuses increase. Therefore, means for detecting a sheet medium inserted into an insertion port with a novel structure is desired.

SUMMARY OF THE INVENTION

It is an object of the present invention to at least partially solve the problems in the conventional technology.

According to an aspect of the present invention, an image reading apparatus includes: an apparatus body including an insertion port into which a sheet medium is insertable; an existing light source that is provided in the apparatus body and illuminates when an image is read with respect to the sheet medium that has been inserted into the insertion port; a light guide and output unit that is optically connected to the existing light source, guides light emitted from the existing light source, and outputs the guided light into the insertion port; a light receiving unit that detects the output light; and a determining unit that determines whether the sheet medium has been inserted into the insertion port based on a result of the detection by the light receiving unit, wherein the existing light source also illuminates when the determining unit determines whether the sheet medium has been inserted into the insertion port, and a region in the insertion port through which the light output from the light guide and output unit passes exists from one end to the other end of the insertion port in a width direction that is a longitudinal direction of the insertion port.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an image reading apparatus according to the present invention will be explained below in detail with reference to the accompanying drawings. The present invention is not limited to the embodiments.

Figure 1:
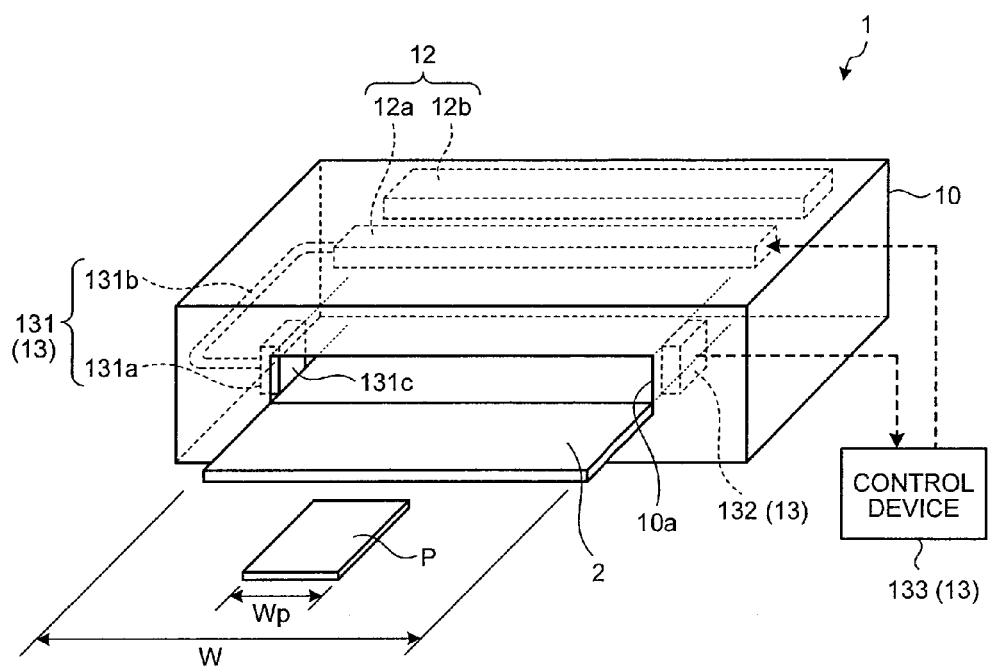
FIG. 1 is a perspective view of an outline of an image reading apparatus according to a first embodiment.
Figure 2:
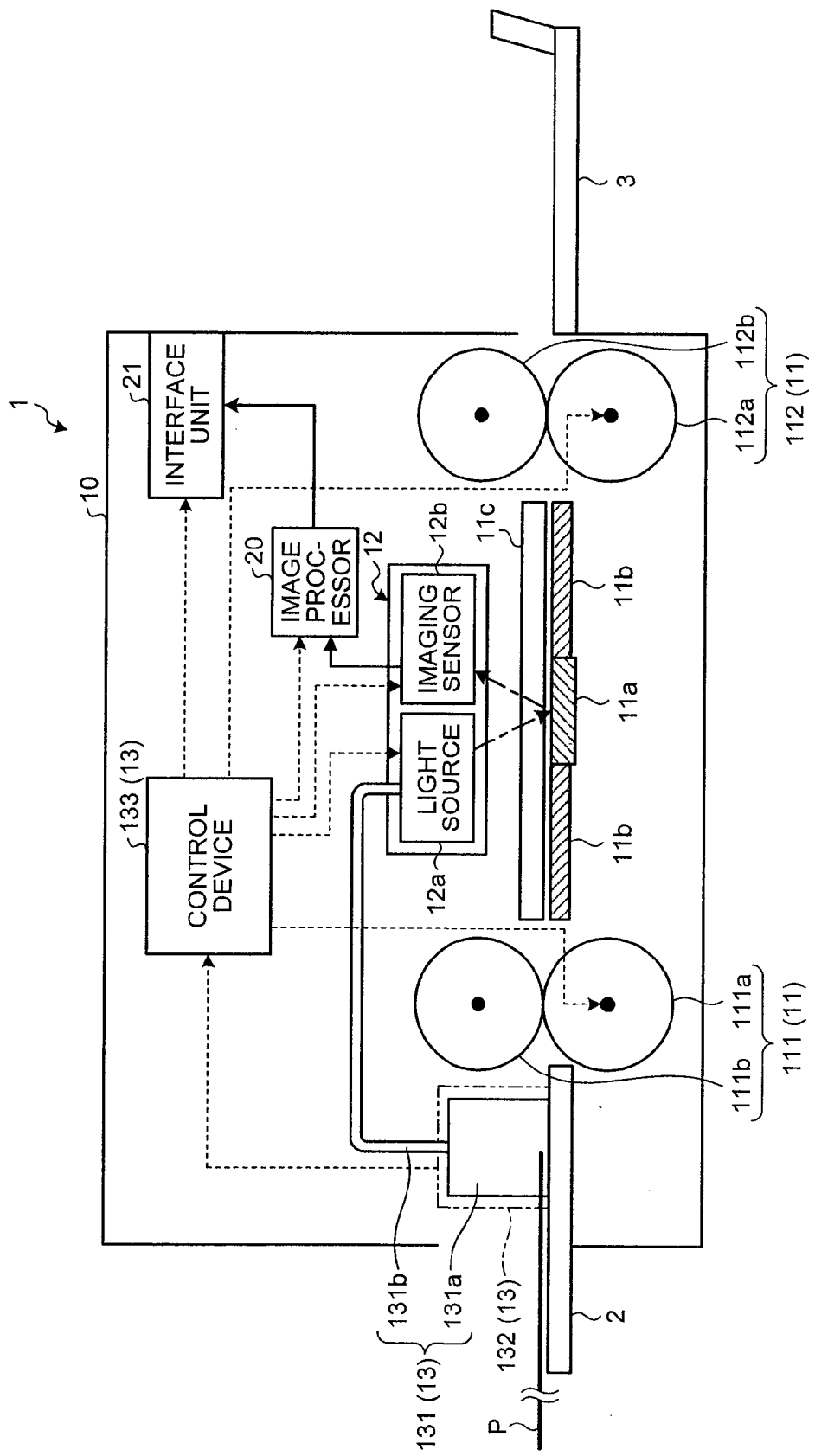
FIG. 2 is a side view of the outline of the image reading apparatus.
Figure 3:
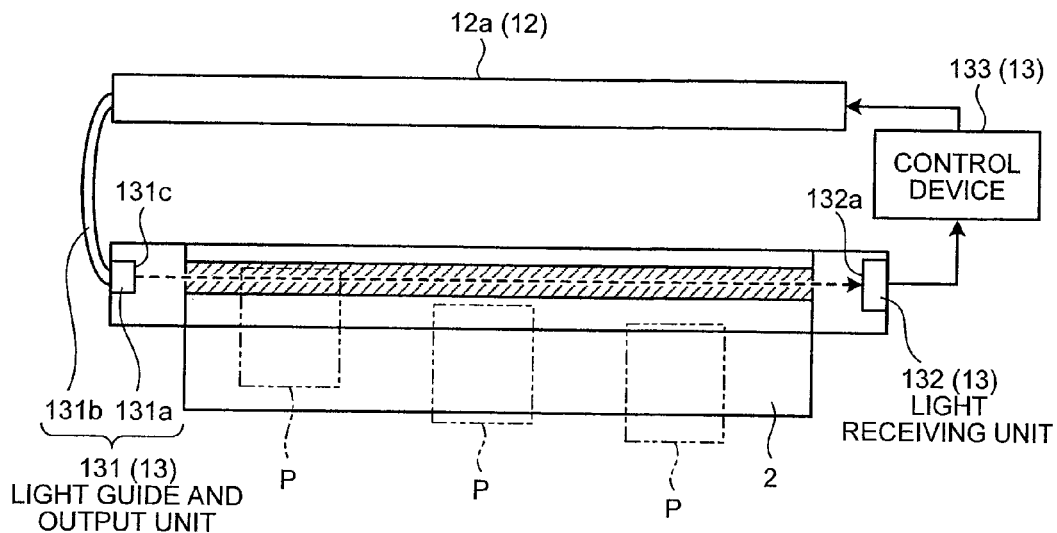
FIG. 3 is a top view of important parts of the image reading apparatus.

An image reading apparatus according to a first embodiment of the present invention is explained below. FIG. 1 is a perspective view of an outline of the image reading apparatus according to the first embodiment, FIG. 2 is a side view of the outline of the image reading apparatus, and FIG. 3 is a top view of important parts of the image reading apparatus. An image reading apparatus 1 conveys a sheet medium P and picks up an image of the conveyed sheet medium P. Hereinafter, the sheet medium P is simply referred to as "the medium P". In the first embodiment, the image reading apparatus 1 is a so-called free set scanner in which positioning of the medium P inserted into an insertion port 10a in a width direction is not required when the medium P is inserted into the insertion port 10a. The width direction is a longitudinal direction of the insertion port 10a. The image reading apparatus 1 includes an apparatus body 10, a conveying roller 11, an imaging unit 12, and a medium detecting device 13.

The apparatus body 10 accommodates components of the image reading apparatus 1 such as the conveying roller 11, the imaging unit 12, and the medium detecting device 13 according to the first embodiment. In the first embodiment, the apparatus body 10 is a rectangular-box-shaped housing, and the insertion port 10a is formed on one of four lateral faces of the apparatus body 10 being placed on a plane. The insertion port 10a is an opening for inserting the medium P into the apparatus body 10, and is a rectangular opening, long in a direction substantially parallel to the plane in a front view. A width W in the width direction, which is the longitudinal direction of the insertion port 10a, is set wider than a width Wp of the medium P having the largest width in the width direction, of media P that are able to be imaged by the imaging unit 12 in the apparatus body 10.

The conveying roller 11 conveys the medium P. In the first embodiment, the conveying roller 11 includes, for example, a paper feed roller 111, which is a pair of rollers, and a paper ejection roller 112, which is also a pair of rollers.

The paper feed roller 111 is the conveying roller 11 arranged most upstream in a conveyance direction, and is configured to convey the medium P inserted from a paper feed tray 2 into the apparatus body 10 to an imaging position of the medium P by the imaging unit 12. The conveyance direction here is a direction in which the medium P is conveyed. Hereinafter, the imaging position of the medium P by the imaging unit 12 is simply referred to as "imaging position". In the first embodiment, the paper feed roller 111 is a roller pair including a drive roller 111a with its rotation axis being arranged below a conveyance path, and a driven roller 111b with its rotation axis being arranged above the conveyance path. In the first embodiment, the driven roller 111b faces the drive roller 111a with the conveyance path therebetween, and is arranged to be able to contact with the drive roller 111a.

In the first embodiment, the driven roller 111b is supported so that it is pressed against a surface of the medium P that has entered between the drive roller 111a and the driven roller 111b. In the first embodiment, when the medium P has not entered between the driven roller 111b and the drive roller 111a, an outer peripheral surface of the driven roller 111b is in contact with an outer peripheral surface of the drive roller 111a. The drive roller 111a comes in contact with the medium P that has entered between the drive roller 111a and the driven roller 111b, and is rotated by a drive system described later, to convey the medium P in contact with the drive roller 111a in the conveyance direction.

The paper ejection roller 112 is the conveying roller 11 arranged most downstream in the conveyance direction, and ejects the medium P that has been imaged by the imaging unit 12 to a paper ejection tray 3, that is, to outside of the apparatus body 10. In the first embodiment, the paper ejection roller 112 is a roller pair including a drive roller 112a with its rotation axis being arranged below the conveyance path, and a driven roller 112b with its rotation axis being arranged above the conveyance path. Because the relation between the drive roller 112a and the driven roller 112b are the same as that between the drive roller 111a and the driven roller 111b, explanation thereof will be omitted.

A backing member 11a and a conveyance guide 11b are arranged between the paper feed roller 111 and the paper ejection roller 112. The backing member 11a faces the imaging unit 12, with an image-read support plate 11c described later therebetween, and is arranged on an optical axis of light emitted from the imaging unit 12. In the first embodiment, the backing member 11a is supported by the apparatus body 10 of the image reading apparatus 1. The width of the backing member 11a in a main scanning direction, which is a direction orthogonal to the conveyance direction, is set longer than the width of the medium P having the largest width in the main scanning direction of the media P that are able to be scanned by the image reading apparatus 1. Therefore, a part of the backing member 11a is scanned together with the medium P when the medium P is scanned by the imaging unit 12.

The conveyance guide 11b is arranged between the paper feed roller 111 and the backing member 11a, and the paper ejection roller 112 and the backing member 11a. That is, two conveyance guides 11b are arranged between the paper feed roller 111 and the paper ejection roller 112, with the backing member 11a between the two conveyance guides 11b in the conveyance direction. These conveyance guides 11b are supported by the apparatus body 10 of the image reading apparatus 1 according to the first embodiment. The conveyance guides 11b support the medium P conveyed by the conveying roller 11 between the drive roller 111a and the backing member 11a, or between the drive roller 112a and the backing member 11a.

The conveyance guide 11b, together with the backing member 11a, is arranged opposite to the image-read support plate 11c. The image-read support plate 11c supports the medium P conveyed by the paper feed roller 111 and the paper ejection roller 112. The image-read support plate 11c is a clear and colorless plate member. In the first embodiment, the image-read support plate 11c is arranged above the backing member 11a and the conveyance guide 11b.

The drive roller 111a and the drive roller 112a are rotated by the drive system (not illustrated). The drive system includes, for example, a drive motor and a driving-force transmission device. The drive motor is, for example, a stepping motor. The drive motor is driven by supplying power from a control device 133 described later, and, for example, driven by transmitting a pulse signal from the control device 133. Accordingly, the drive motor is able to rotate (in a clockwise direction in FIG. 2,) the drive roller 111a and the drive roller 112a, respectively, via the driving-force transmission device.

The conveying roller 11, that is, the paper feed roller 111 and the paper ejection roller 112 are driven via the driving-force transmission device by supplying power to the drive motor by the control device 133.

The imaging unit 12 is an image pickup device. The imaging unit 12 is configured to pick up an image of the medium P conveyed by the conveying roller 11. In the first embodiment, the imaging unit 12 is arranged between the two conveyance guides 11b in the conveyance direction. In the first embodiment, one imaging unit 12 is arranged on a side opposite to a side where the two conveyance guides 11b are arranged with respect to the conveyance path, that is, above the conveyance path, and faces the conveyance path. One imaging unit 12 may be arranged each above and below the conveyance path, to pick up images on both sides of the medium P.

The imaging unit 12 includes a light source 12a and an imaging sensor 12b.

The light source 12a is an existing light source. That is, the light source 12a is an existing light source that illuminates when performing an image reading operation with respect to the medium P inserted into the insertion port 10a. The light source 12a is configured to irradiate light to the medium P supported by the backing member 11a and the image-read support plate 11c. The light source 12a is provided in the apparatus body 10. The light source 12a is arranged, for example, near the imaging sensor 12b in the conveyance direction, and is arranged upstream of the imaging sensor 12b according to the first embodiment. For example, the light source 12a is a white fluorescent lamp, a light emitting diode (LED), or the like, which scatters outgoing beams by a light guide plate (not illustrated), and emits linear light toward the medium P being conveyed by the conveying roller 11 in the main scanning direction. The light source 12a is optically connected to a light guide and output unit 131 described later, to emit light also to the light guide and output unit 131. The light source 12a illuminates when determination of whether the medium P has been inserted into the insertion port 10a is performed. The light source 12a illuminates in response to a lighting instruction from the control device 133.

The imaging sensor 12b includes, for example, a plurality of charge coupled device (CCD) image pickup devices. The imaging sensor 12b may include, for example, a plurality of CMOS image pickup devices. When the imaging sensor 12b includes the plurality of CCD image pickup devices, a white fluorescent lamp or a white LED, for example, is used as the light source 12a. When the imaging sensor 12b includes the CMOS image pickup devices, that is, when the image reading apparatus 1 is a so-called contact image sensor (CIS) image reading apparatus, three types of LEDS, that is, an RLED that emits R light, a GLED that emits G light, and a BLED that emits B light are used as the light source 12a.

The image pickup devices provided in the imaging sensor 12b are arranged linearly in the main scanning direction. The imaging sensor 12b is arranged on the optical axis of reflected light, which is light from the light source 12a reflected by the medium P being conveyed by the conveying roller 11. The imaging sensor 12b scans a read area, which is an area including the whole area of the medium P therein when the medium P is conveyed by the conveying roller 11 in the conveyance direction while the light source 12a is illuminating. Accordingly, when the medium P is being conveyed by the conveying roller 11 toward an imaging position in the conveyance direction, in other words, when scanning of the medium P is being executed, because reflected light, which is light from the light source 12a reflected by the medium P, enters each of the image pickup devices of the imaging sensor 12b, each of the image pickup devices of the imaging sensor 12b outputs a picked-up image signal per exposure corresponding to the read area. The imaging sensor 12b generates and outputs line data per main scanning direction based on the picked-up image signal per exposure output from each image pickup device.

The imaging sensor 12b picks up an image of the medium P based on reflected light from the medium P being conveyed by the conveying roller 11 toward the imaging position. Such an imaging sensor 12b picks up an image of the medium P according to an imaging instruction from the control device 133.

The medium detecting device 13 detects the medium P inserted into the insertion port 10a. The medium detecting device 13 includes the light guide and output unit 131, a light receiving unit 132, and the control device 133.

The light guide and output unit 131 outputs light emitted from the light source 12a into the insertion port 10a. In the first embodiment, the light guide and output unit 131 includes a light outputting unit 131a and a light guiding member 131b.

The light outputting unit 131a outputs light guided by the light guiding member 131b into the inside of the insertion port 10a. The inside of the insertion port 10a referred to here is a space forming an opening of the insertion port 10a, when the insertion port 10a is viewed from the front. In the first embodiment, the light outputting unit 131a is provided at one end in a width direction in the inside of the insertion port 10a. An exit surface 131c from which light is output is exposed to the inside of the insertion port 10a, and the light outputting unit 131a outputs light guided by the light guiding member 131b to the inside of the insertion port 10a.

The light guiding member 131b optically connects the light source 12a and the light outputting unit 131a. In the first embodiment, the light guiding member 131b is a long member and is, for example, a light guiding prism or an optical fiber. The light guiding member 131b is between the light source 12a and the light outputting unit 131a. One end of the light guiding member 131b in a longitudinal direction is optically connected to the light outputting unit 131a. In the first embodiment, one end of the light guiding member 131b in the longitudinal direction is integrally connected to the light outputting unit 131a. The other end of the light guiding member 131b in the longitudinal direction is optically connected to the light source 12a. In the first embodiment, the other end of the light guiding member 131b in the longitudinal direction is integrally connected to a light guide plate (not illustrated) of the light source 12a. The light guiding member 131b may be a reflection mirror placed between the light source 12a and the light outputting unit 131a, instead of the long member. That is, the light guide and output unit 131 is optically connected to the light source 12a, and guides light emitted from the light source 12a by the light guiding member 131b to output the guided light to the inside of the insertion port 10a by the light outputting unit 131a.

The light receiving unit 132 detects light output from the light guide and output unit 131. The light receiving unit 132 is provided at the other end in the width direction in the inside of the insertion port 10a. In the light receiving unit 132, a light receiving surface 132a that receives light is exposed to the inside of the insertion port 10a. In the light receiving unit 132, the light receiving surface 132a is arranged opposite to the exit surface 131c of the light outputting unit 131a in the light guide and output unit 131 via the insertion port 10a, to detect light that has been output from the light outputting unit 131a and has passed through the inside of the insertion port 10a. In the first embodiment, the light receiving unit 132 is able to detect lighting characteristics of the light source 12a based on the detected light.

That is, in the first embodiment, the light guide and output unit 131 outputs light emitted from the light source 12a from one end of the insertion port 10a in the width direction. The light receiving unit 132 detects light output from the light guide and output unit 131 at the other end of the insertion port 10a in the width direction.

Therefore, a region in which light output from the light guide and output unit 131 passes in the insertion port 10a exists from the one end to the other end of the insertion port 10a in the width direction. In the first embodiment, in the passing region of the light output from the light guide and output unit 131 in the insertion port 10a, one beam of light output from the light outputting unit 131a traverses between the one end and the other end of the insertion port 10a along the width direction. Hereinafter, the passing region of the light output from the light guide and output unit 131 in the insertion port 10a is simply referred to as "passing region of light".

The control device 133 controls at least the conveying roller 11 and the imaging unit 12.

The control device 133 functions as a determining unit, and is configured to determine whether the medium P has been inserted into the insertion port 10a based on a detection result of the light receiving unit 132. In the first embodiment, the control device 133 compares the lighting characteristics of the light source 12a described later and the detection result of the light receiving unit 132, to determine whether the medium P has been inserted into the insertion port 10a based on a result of the comparison.

The control device 133 also functions as a lighting control device, and is configured to change the lighting characteristics of the light source 12a when determining whether the medium P has been inserted into the insertion port 10a as the determining unit. In the first embodiment, when determining whether the medium P has been inserted into the insertion port 10a as the determining unit, the control device 133 changes the lighting characteristics of the light source 12a to lighting characteristics for medium detection. The lighting characteristics of the light source 12a referred to here is output of the light source 12a, which is the amount of light or strength of light emitted from the light source 12a, periodic blinking of the light source 12a, or a wavelength of light emitted from the light source 12a. That is, in the first embodiment, the control device 133, when determining whether the medium P has been inserted into the insertion port 10a, periodically fluctuates the output of the light source 12a, periodically blinks the light source 12a, or periodically changes the wavelength of light emitted from the light source 12a, to detect whether the medium P has been inserted into the insertion port 10a, with respect to the lighting characteristics of the light source 12a during the image reading operation.

When determining whether the medium P has been inserted into the insertion port 10a as the determining unit, the control device 133 causes the light source 12a to emit light with the lighting characteristics different from those of ambient light. Specifically, for example, when ambient light is fluorescent light, that is, periodically blinking light, the control device 133 periodically fluctuates the output of the light source 12a in a cycle different from a blinking cycle of ambient light, periodically blinks the light source 12a in a cycle different from the blinking cycle of ambient light, or periodically changes the wavelength of light emitted from the light source 12a in a cycle different from the blinking cycle of ambient light, when determining whether the medium P has been inserted into the insertion port 10a as the determining unit. In the following explanation, it is assumed that the control device 133 periodically blinks the light source 12a when determining whether the medium P has been inserted into the insertion port 10a as the determining unit.

In FIG. 2, an image processor denoted by reference numeral 20 collects a plurality of line data output from the imaging sensor 12b to generate picked up image data corresponding to the whole area of the medium P. In FIG. 2, an interface unit denoted by reference numeral 21 enables communications between the image reading apparatus 1 and an external electronic device (not illustrated). The image processor 20 generates the picked up image data corresponding to the whole area of the medium P in response to an image processing instruction from the control device 133. The interface unit 21 starts communications of the picked up image data between, for example, the image processor 20 and the external electronic device in response to a communication instruction from the control device 133. The image processor 20 and the interface unit 21 are controlled by the control device 133.

An operation of the image reading apparatus 1 according to the first embodiment is explained next.

Figure 4:
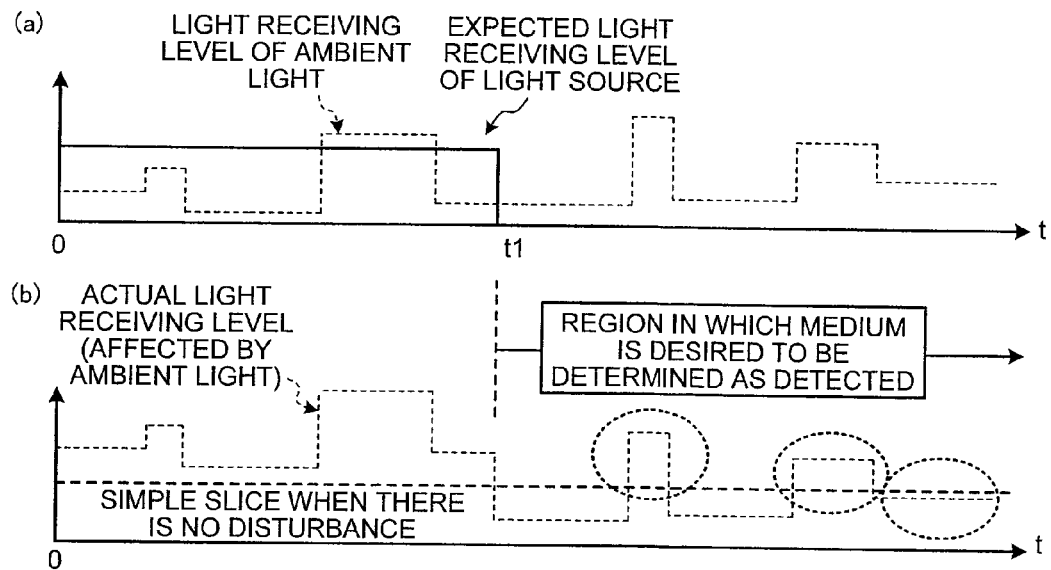
FIG. 4 is a timing chart indicating relation between amounts of light received and a slice while an existing light source is continuously illuminating.

FIG. 4 is a timing chart indicating relation between amounts of light received and a slice while an existing light source is continuously illuminating, where (a) in FIG. 4 depicts light receiving levels of light output from the light guide and output unit 131 and light receiving levels of ambient light and (b) in FIG. 4 depicts light receiving levels of light, which is a combination of the light output from the light guide and output unit 131 and the ambient light. As illustrated in (a) in FIG. 4, when the control device 133 determines whether the medium P has been inserted into the insertion port 10a, if the light source 12a is continuously illuminated with the lighting characteristics during the image reading operation, that is, with a constant amount of light, light output from the light guide and output unit 131 is detected at a constant light receiving level by the light receiving unit 132 (at time points 0≤t<t1) until the medium P is inserted into the insertion port 10a. However, when the medium P is inserted into the insertion port 10a (at time point t=t1), light output from the light guide and output unit 131 is blocked by the medium P inserted into the insertion port 10a and is not detected by the light receiving unit 132 (at time points t≥t1).

As illustrated in (a) in FIG. 4, when the ambient light is received by the light receiving surface 132a of the light receiving unit 132, because light detected by the light receiving unit 132 includes a mixture of the light output from the light guide and output unit 131 and the ambient light, as illustrated in (b) in FIG. 4, the light receiving level of the light detected by the light receiving unit 132 becomes the sum total of the light receiving level of the light output from the light guide and output unit 131 and the light receiving level of the ambient light. Therefore, when the ambient light is received by the light receiving surface 132a of the light receiving unit 132, even if the medium P is inserted into the insertion port 10a, the light receiving level in the light receiving unit 132 exceeds the slice with respect to the amount of light received by the light receiving unit 132 relatively frequently. That is, when the ambient light is received by the light receiving surface 132a of the light receiving unit 132, the control device 133 may determine that the medium P has not been inserted into the insertion port 10a, even if the medium P has been inserted into the insertion port 10a.

Figure 5:
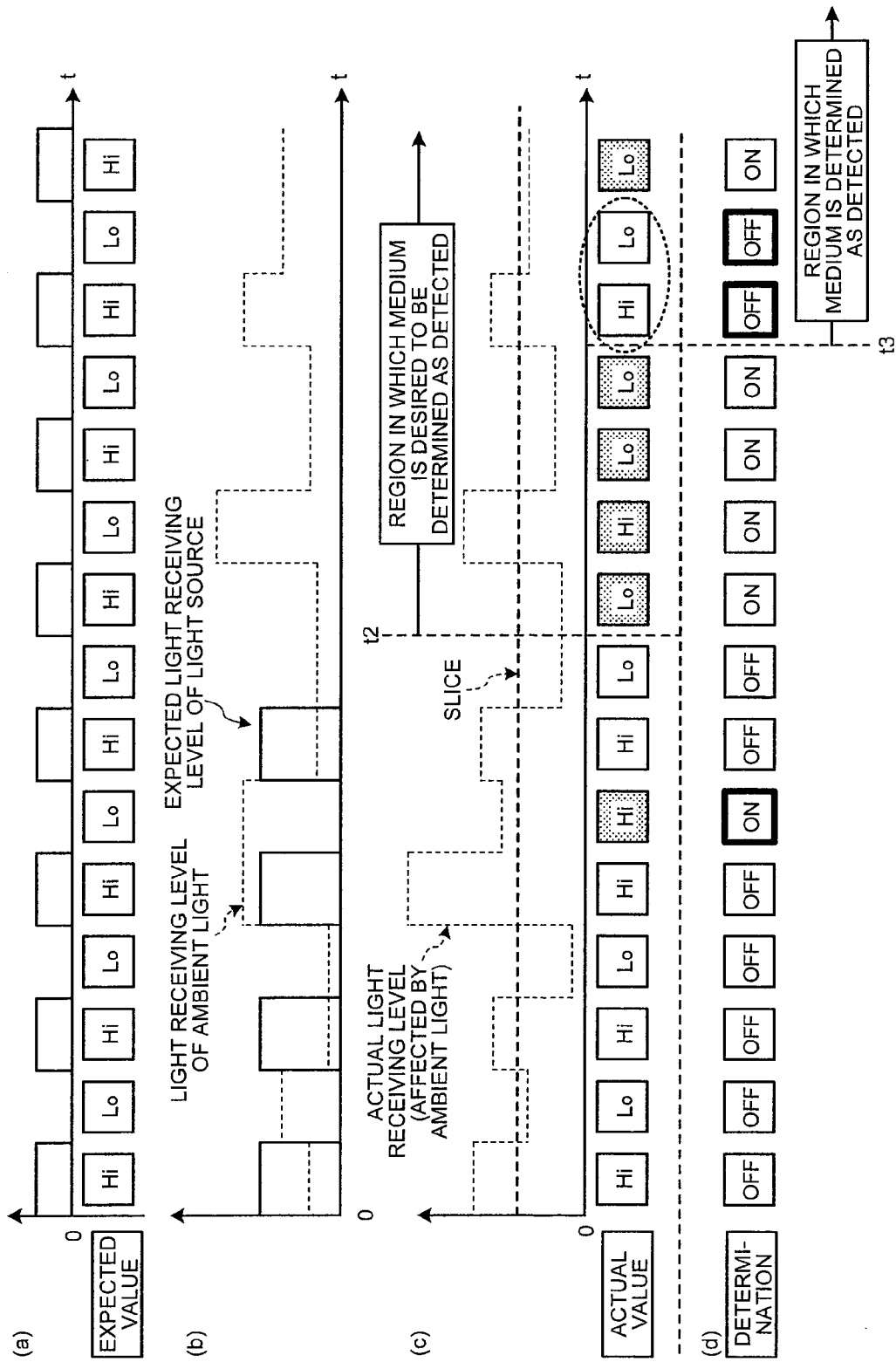
FIG. 5 is a timing chart indicating relation between amounts of light received and a slice while the existing light source is blinking.

Therefore, the control device 133 is configured to periodically blink the light source 12a to improve detection accuracy of the medium P, when determining whether the medium P has been inserted into the insertion port 10a. FIG. 5 is a timing chart indicating relation between amounts of light received and a slice while the existing light source is blinking, where (a) in FIG. 5 depicts a lighting pattern of the light source 12a, (b) in FIG. 5 depicts light receiving levels of light output from the light guide and output unit 131 and light receiving levels of ambient light, (c) in FIG. 5 depicts light receiving levels of light of a combination of the light output from the light guide and output unit 131 and the ambient light, and (d) in FIG. 5 depicts a determination result of whether the medium P has been inserted into the insertion port 10a.

As illustrated in (a) and (b) in FIG. 5, the control device 133 causes the light source 12a to illuminate with the lighting characteristics different from that of the ambient light. In the first embodiment, when the control device 133 periodically changes the output of the light source 12a alternately between a high (Hi) level and a low (Lo) level, light output from the light guide and output unit 131 is detected in the same pattern as the lighting pattern of the light source 12a by the light receiving unit 132, until the medium P is inserted into the insertion port 10a (at time points 0≤t<t2). However, when the medium P is inserted into the insertion port 10a (at time point t=t2), the light output from the light guide and output unit 131 is blocked by the medium P inserted into the insertion port 10a, and is not detected by the light receiving unit 132 (at time points t≥t2). These are similar to the case illustrated in FIG. 4.

When the ambient light is received by the light receiving surface 132a of the light receiving unit 132, as illustrated in (b) in FIG. 5, the light detected by the light receiving unit 132 includes a mixture of the light output from the light guide and output unit 131 and the ambient light. Therefore, as illustrated in (c) in FIG. 5, the light receiving level of light detected by the light receiving unit 132 becomes the sum total of the light receiving level of light output from the light guide and output unit 131 and the light receiving level of the ambient light. However, because the light source 12a repeats the blinking, the light output from the light guide and output unit 131 is intermittently received by the light receiving surface 132a of the light receiving unit 132. Therefore, the light receiving level of light detected by the light receiving unit 132 while the light source 12a is turned off becomes the light receiving level of the ambient light. Accordingly, when the light source 12a is turned off, the light receiving level in the light receiving unit 132 is able to be prevented from exceeding the slice with respect to the amount of light received in the light receiving unit 132. That is, when the light source 12a is repeating the blinking, the light receiving level in the light receiving unit 132 is able to be prevented from continuously exceeding the slice with respect to the amount of light received in the light receiving unit 132.

Shaded portions in (c) in FIG. 5 indicate portions where the detection results of the light receiving unit 132 are different from the lighting pattern of the light source 12a. The control device 133 compares the lighting pattern of the light source 12a with the detection result of the light receiving unit 132 to extract the portions where the detection results of the light receiving unit 132, that is, actual values of light detected by the light receiving unit 132 are different from the lighting pattern of the light source 12a. In (d) in FIG. 5, portions where the actual values of light detected by the light receiving unit 132 are different from the lighting pattern of the light source 12a are expressed as "ON", and portions where the actual values of light detected by the light receiving unit 132 are the same as the lighting pattern of the light source 12a are expressed as "OFF".

As illustrated in (c) and (d) in FIG. 5, the control device 133 determines that the medium P has been detected when the lighting pattern of the light source 12a and the detection result of the light receiving unit 132 consecutively differ a plurality of times, to distinguish whether the medium detecting device 13 has detected the ambient light or the medium P. In an example illustrated in FIG. 5, the control device 133 determines that the medium P has been inserted into the insertion port 10a (at time points t≥t3), when the lighting pattern of the light source 12a and the detection result of the light receiving unit 132 consecutively has differed at least four times, that is, for two pulses or more of the lighting instruction input to the light source 12a (at time point t=t3). That is, the control device 133 is not able to distinguish whether the medium detecting device 13 has detected the ambient light or the medium P, from the lighting pattern of the light source 12a that blinks in response to the lighting instruction for one pulse and the light receiving result of the light receiving unit 132. Therefore, the control device 133 is configured to compare the lighting pattern of the light source 12a that blinks in response to the lighting instruction for at least one more pulse with the detection result of the light receiving unit 132, to distinguish whether the medium detecting device 13 has detected the ambient light or the medium P.

In the example illustrated in FIG. 5, when the number of times that the lighting pattern of the light source 12a and the detection result of the light receiving unit 132 consecutively differ is equal to or greater than one and less than four, the control device 133 determines that the light receiving unit 132 has detected the ambient light, and that the medium P has not been inserted into the insertion port 10a. That is, when the lighting pattern of the light source 12a and the detection result of the light receiving unit 132 are different, the control device 133 is able to distinguish whether a difference between the lighting pattern of the light source 12a and the detection result of the light receiving unit 132 is due to the influence of the ambient light or due to the insertion of the medium P into the insertion port 10a. Accordingly, determination accuracy of whether the medium P has been inserted into the insertion port 10a is able to be improved.

In (d) in FIG. 5, portions falsely detected due to the influence of the ambient light are indicated with solid frames. While the control device 133 is determining that the medium P has not been inserted into the insertion port 10a, if the control device 133 detects that the lighting pattern of the light source 12a and the detection result of the light receiving unit 132 are different, the control device 133 determines this as a false detection due to the influence of the ambient light, if the number of times that the lighting pattern of the light source 12a and the detection result of the light receiving unit 132 consecutively has differed is equal to one or greater than one and less than four, as indicated by the solid frame on the left side. That is, in the example illustrated in FIG. 5, if the control device 133, after having consecutively determined "OFF", newly determines "ON" and "ON" continues once or more and less than four times, the control device 133 determines it/them as false detection due to the influence of the ambient light. While the control device 133 is determining that the medium P has been inserted into the insertion port 10a, if the control device 133 detects that the lighting pattern of the light source 12a and the detection result of the light receiving unit 132 are the same as indicated by a portion enclosed by a broken line, the control device 133 determines this as a false detection due to the influence of the ambient light if the number of times that the lighting pattern of the light source 12a and the detection result of the light receiving unit 132 consecutively match is once or more and less than four as indicated by the solid frames on the right side. That is, in the example illustrated in FIG. 5, if the control device 133, when having consecutively determined "ON", newly determines "OFF" and "OFF" continues once or more and less than four times, the control device 133 determines it/them as false detection due to the influence of the ambient light.

Figure 6:
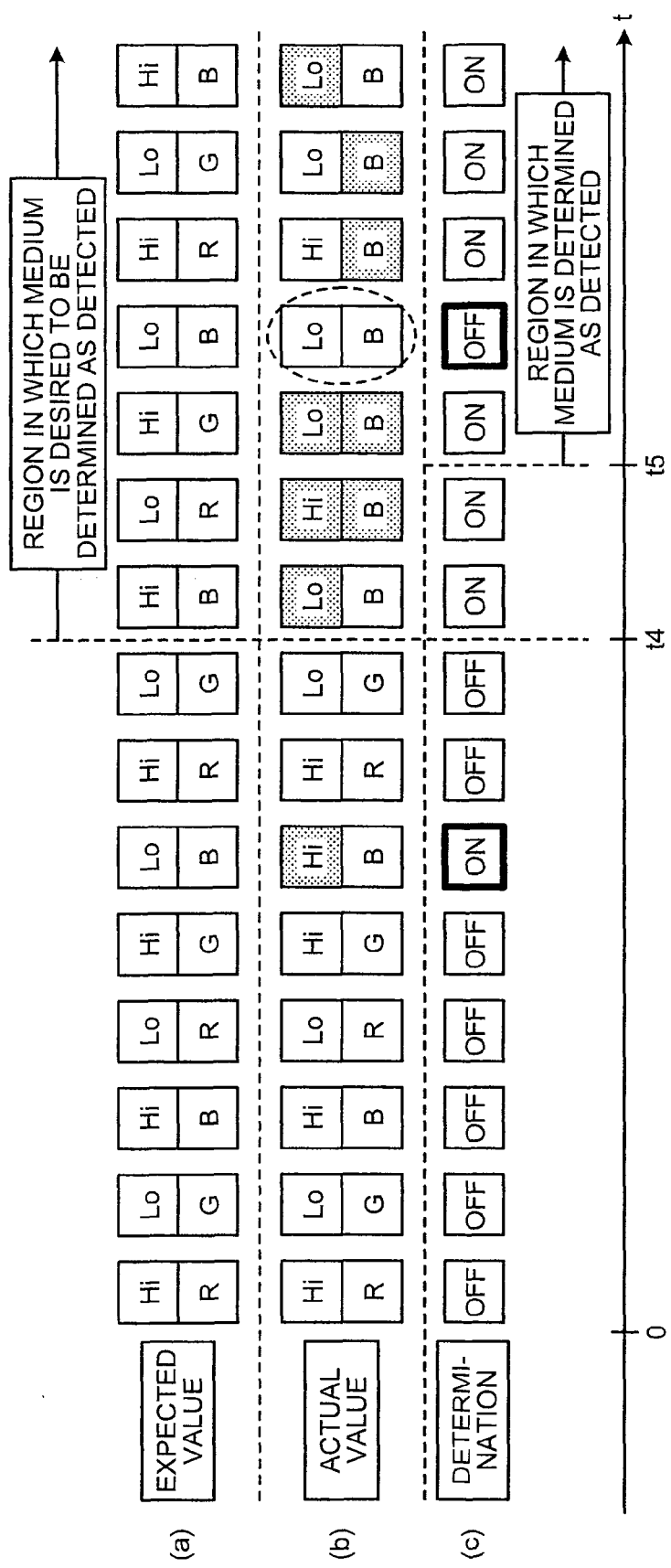
FIG. 6 is a timing chart indicating relation between amounts of light received and a slice while the existing light source is blinking in another way.

When the image reading apparatus 1 is a CIS image reading apparatus, in the lighting pattern of the light source 12a illustrated in FIG. 5, the RLED, the GLED, and the BLED provided in the light source 12a may be allocated one by one sequentially and repeatedly to emit light per switchover between the Hi level and the Lo level are switched. FIG. 6 is a timing chart of relation between amounts of light received and a slice in while the existing light source is blinking in another way, where (a) in FIG. 6 depicts a lighting pattern of the light source 12a, (b) in FIG. 6 depicts light receiving levels and colors of light received by the light receiving unit 132, and (c) in FIG. 6 depicts a determination result whether the medium P has been inserted into the insertion port 10a.

As illustrated in (a) in FIG. 6, the control device 133 allocates the RLED, the GLED, and the BLED one by one sequentially and repeatedly to emit light per switchover of output levels of the light source 12a, while periodically changing the output of the light source 12a alternately between the Hi level and the Lo level. As illustrated in (b) in FIG. 6, light output from the light guide and output unit 131 is detected by the light receiving unit 132 with a same pattern as the lighting pattern of the light source 12a, until the medium P is inserted into the insertion port 10a (at time points 0≤t<t4). However, when the medium P is inserted into the insertion port 10a (at time point t=t4), light output from the light guide and output unit 131 is blocked by the medium P inserted into the insertion port 10a, and is not detected by the light receiving unit 132 (at time points T≥t4).

In an example illustrated in FIG. 6, as in the example illustrated in FIG. 5, a shaded area indicates a portion where the detection result of the light receiving unit 132 is different from the lighting pattern of the light source 12a. The control device 133 compares the lighting pattern of the light source 12a with the detection result of the light receiving unit 132 to extract a portion where the detection result of the light receiving unit 132 is different from the lighting pattern of the light source 12a. In the example illustrated in FIG. 6, a portion where the actual value of light detected by the light receiving unit 132 is different from the lighting pattern of the light source 12a is expressed as "ON", and a portion where the actual value of light detected by the light receiving unit 132 is the same as the lighting pattern of the light source 12a is expressed as "OFF".

The control device 133 determines that the medium P has been detected when the lighting pattern of the light source 12a and the detection result of the light receiving unit 132 consecutively differ from each other a plurality of times, to distinguish whether the medium detecting device 13 has detected ambient light or the medium P. In an example illustrated in FIG. 6, the control device 133 determines that the medium P has been inserted into the insertion port 10a (at time points t≥t5), when the lighting pattern of the light source 12a and the detection result of the light receiving unit 132 consecutively differ at least twice, that is, at least for one pulse of the lighting instruction input to the light source 12a (at time point t=t5). That is, the control device 133 is not able to distinguish whether the medium detecting device 13 has detected the ambient light or the medium P, only from the lighting pattern of the light source 12a that blinks in response to the lighting instruction for one pulse and the slice with respect to the amount of light received at the light receiving unit 132. Therefore, the control device 133 compares the color of light emitted from the light source 12a that blinks in response to the lighting instruction for one pulse with the color of light detected by the light receiving unit 132, to distinguish whether the medium detecting device 13 has detected the ambient light or the medium P.

In the example illustrated in FIG. 6, when the number of times that the lighting pattern of the light source 12a and the detection result of the light receiving unit 132 consecutively differ is only once, the control device 133 determines that the light receiving unit 132 has detected the ambient light, and that the medium P has not been inserted into the insertion port 10a. That is, when the lighting pattern of the light source 12a and the detection result of the light receiving unit 132 are different, the control device 133 is able to not only distinguish whether a difference between the lighting pattern of the light source 12a and the detection result of the light receiving unit 132 is due to an influence of the ambient light or due to insertion of the medium P into the insertion port 10a, but also able to shorten a time period between the insertion of the medium P into the insertion port 10a and the determination of whether the medium P has been inserted into the insertion port 10a (|t5−t4|<|t3−t2|), as compared with the case illustrated in FIG. 5. Accordingly, the determination accuracy of whether the medium P has been inserted into the insertion port 10a is able to be further improved.

In (c) in FIG. 6, a portion falsely detected due to the influence of ambient light is indicated by a solid frame. When the control device 133 is determining that the medium P has not been inserted into the insertion port 10a, if the control device 133 detects that the lighting pattern of the light source 12a and the detection result of the light receiving unit 132 are different and the number of times that the lighting pattern of the light source 12a and the detection result of the light receiving unit 132 consecutively differ is only once, the control device 133 determines this as a false detection due to the influence of the ambient light, as indicated by the solid frame on the left side. That is, in the example illustrated in FIG. 6, if the control device 133 has consecutively determined OFF, newly determines ON, and this "ON" lasts only once, the control device 133 determines it as a false detection due to the influence of the ambient light. When the control device 133 is determining that the medium P has been inserted into the insertion port 10a, if the control device 133 detects that the lighting pattern of the light source 12a and the detection result of the light receiving unit 132 are the same as indicated by a part enclosed by a broken line and the number of times that the lighting pattern of the light source 12a and the detection result of the light receiving unit 132 consecutively match is only once, as indicated by the solid frame on the right side, the control device 133 determines this as a false detection due to the influence of the ambient light. That is, in the example illustrated in FIG. 6, if the control device 133 has consecutively determined ON, newly determines OFF, and this "OFF" lasts only once, the control device 133 determines this as a false detection due to the influence of the ambient light.

In the example illustrated in FIG. 6, because the control device 133 compares the lighting pattern of the light source 12a with the light receiving pattern of the light receiving unit 132 based on the light receiving level and the color of light received by the light receiving unit 132, for example, when the medium P has been inserted into the insertion port 10a, even if the light receiving level in the light receiving unit 132 becomes Hi, the control device 133 is able to determine whether the light received by the light receiving unit 132 is the light emitted from the LED illuminated by the light source 12a, by determining whether the color of the light received by the light receiving unit 132 is the color of light from the LED illuminated by the light source 12a. That is, when the light receiving unit 132 detects light, the control device 133 is able to determine whether the detected light is the light output from the light guide and output unit 131 or the ambient light. Therefore, the detection accuracy of the medium P inserted into the insertion port 10a is able to be improved.

Further, the control device 133 is able to detect the presence of the medium P in the insertion port 10a correspondingly with the timing with which the RLED, the GLED, and the BLED sequentially illuminate at the time of scanning of the medium P by the imaging unit 12. In this case, because the control device 133 is able to detect whether at least a part of the medium P, which is a target to be read for picking up an image, is present in the insertion port 10a at the time of scanning the medium P by the imaging unit 12, for example, when a state of the medium P that is the target to be read for picking up the image is changed from a detected state to an undetected state in the insertion port 10a, the control device 133 is able to determine that the medium P that is the target to be read for picking up the image is discharged from the apparatus body 10, or to detect a rear end of a read area of the medium P in the conveyance direction.

Figure 7:
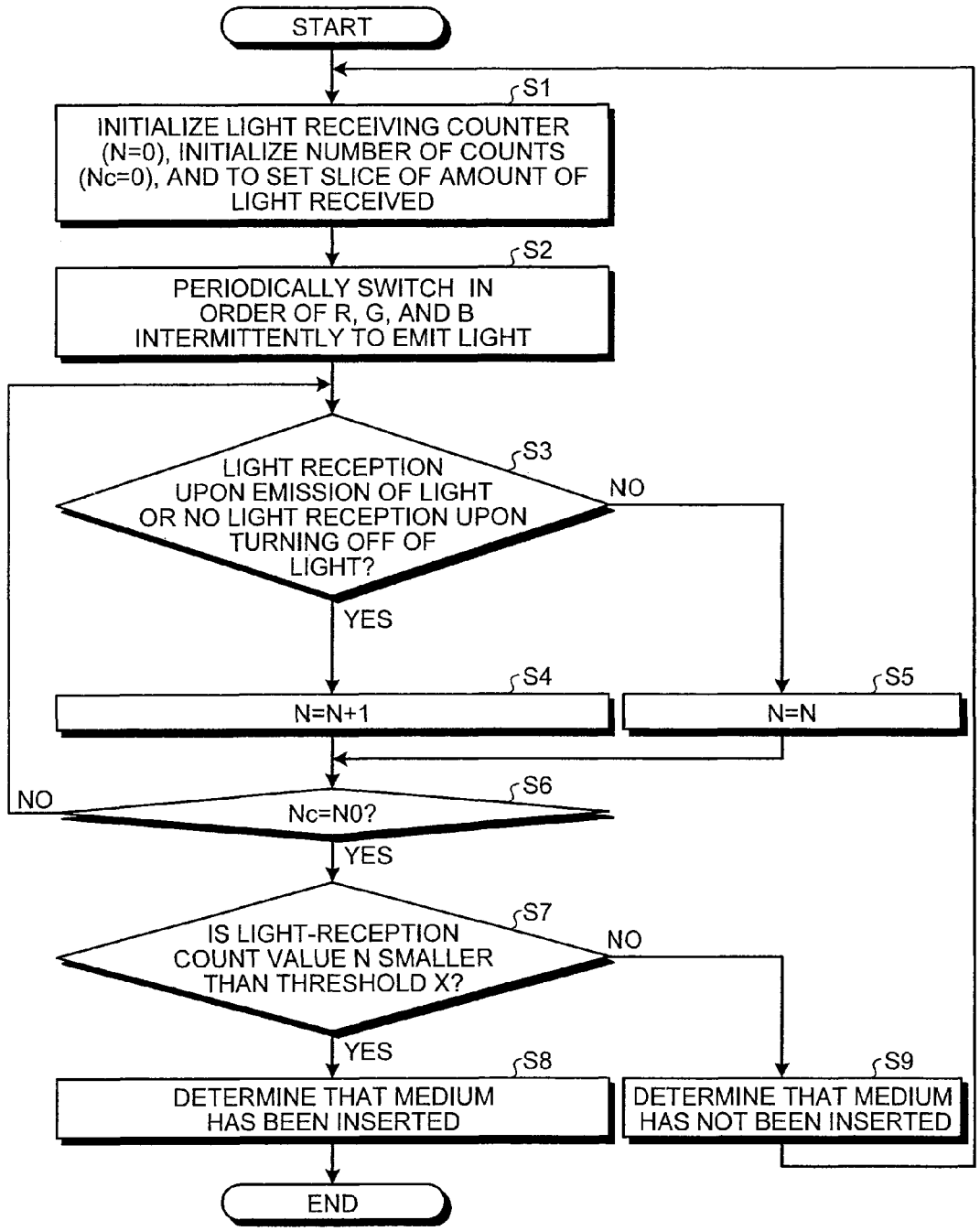
FIG. 7 is a flowchart of an outline of an operational procedure of the image reading apparatus.

FIG. 7 is a flowchart of an outline of an operational procedure of the image reading apparatus. As illustrated in FIG. 7, when the power of the image reading apparatus 1 is turned on from an off state, the control device 133 initializes a light receiving counter (light-reception count value N=0) and initializes the number of counts Nc (Nc=0) to set a slice of the amount of light received at the time of starting scanning (Step S1).

The control device 133 periodically switches the light source 12a intermittently in order of R, G, and B (red, green, and blue) to emit light (Step S2), and determines whether the detection result by the light receiving unit 132 is either light reception upon emission of light or no light reception upon turning off of the light (Step S3). In the first embodiment, at Step S2, the control device 133 periodically switches the light source 12a intermittently in order of R, G, and B to emit light. That is, in the first embodiment, when determining whether the medium P has been inserted into the insertion port 10a, the control device 133 causes the light source 12a to operate intermittently. Specifically, in the first embodiment, when determining whether the medium P has been inserted into the insertion port 10a, the control device 133 causes the light source 12a to operate every fixed period of time. In the first embodiment, the fixed period of time is preset to about the same period of time as the time required for inserting the medium P into the insertion port 10a by a user, for example, to 0.5 second. The fixed period of time may be set relatively short, such as to a second. When the image reading apparatus is the CIS image reading apparatus, the control device 133 determines whether the medium P has been inserted into the insertion port 10a, further taking into consideration the color of light received by the light receiving unit 132, an output level of light emitted from the light source 12a, and the light receiving level of light received by the light receiving unit 132, at the time of determining whether the detection result of the light receiving unit 132 is either light reception upon emission of light or no light reception upon turning off of the light.

When having determined that the detection result of the light receiving unit 132 is the light reception upon emission of light or no light reception upon turning off of the light (YES at Step S3), the control device 133 sets the light-reception count value N at N=N+1, that is, increases the light-reception count value by one (Step S4). When having determined that the detection result of the light receiving unit 132 is not either light reception upon emission of light or no light reception upon turning off of the light (NO at Step S3), the control device 133 keeps the light-reception count value at N=N, that is, does not change the light-reception count value (Step S5).

The control device 133 determines whether the number of counts Nc has reached a specified number of measurements N0, which is the number of measurements that is predetermined, that is, whether Nc=N0 (Step S6). When determining that the number of counts Nc has not reached the specified number of measurements N0 (NO at Step S6), the control device 133 determines whether the detection result of the light receiving unit 132 corresponds to either light reception upon emission of light or no light reception upon turning off of the light, while periodically switching the light source 12a intermittently in the order of R, G, and B to emit light, until the number of counts Nc reaches the specified number of measurements N0, and repeats updating of the light-reception count value N according to the determination result (Steps S3 to S5). As a result of repeating updating of the light-reception count value N by the control device 133, the light-reception count value N increases with an increase in the number of times that the lighting pattern of the light source 12a and the light receiving pattern of the light receiving unit 132 match.

When determining that the number of counts Nc has reached the specified number of measurements N0 (YES at Step S6), the control device 133 determines whether the light-reception count value N is smaller than a threshold X (Step S7). The threshold X is a threshold of the light-reception count value N for determining whether the medium P has been inserted into the insertion port 10a, and is preset. When determining that the light-reception count value N is smaller than the threshold X (YES at Step S7), the control device 133 detects that the medium has been inserted (Step S8).

Upon detection of insertion of the medium, the control device 133 finishes determination of whether the medium P has been inserted into the insertion port 10a (END). When having detected insertion of the medium to finish determination of whether the medium P has been inserted into the insertion port 10a, the control device 133 performs pre-pull-in control and scanning. The pre-pull-in control performed here means controlling such that when the power of the image reading apparatus 1 is turned on from an off state, the control device 133 supplies power to the drive motor to rotate the drive roller 111a before a scanning button (not illustrated) is pressed, to thereby hold an end of the medium P inserted into the insertion port 10a in the conveyance direction by the drive roller 111a and the driven roller 111b.

When determining that the light-reception count value N is equal to or larger than the threshold X (NO at Step S7), the control device 133 determines that the medium has not been inserted (Step S9). When determining that the medium has not been inserted, the control device 133 initializes the light receiving counter and the number of counts, and sets the slice of the amount of light received (Step S1), and repeats measurement of the light-reception count value N while periodically switching the light source 12a intermittently in the order of R, G, and B to emit light (Steps S2 to S6), until determining that the light-reception count value N is smaller than the threshold X (YES at Step S7).

As explained above, in the image reading apparatus 1 according to the first embodiment, when the medium P is inserted into the insertion port 10a of the apparatus body 10, at least a part of light output from the light guide and output unit 131 is blocked in the insertion port 10a by the medium P inserted into the insertion port 10a, and light received by the light receiving unit 132 changes. Specifically, for example, the amount of light received by the light receiving unit 132 decreases. Therefore, the detection result of the light receiving unit 132 differs according to whether the medium P has been inserted into the insertion port 10a. Accordingly, the determination result of the light receiving unit 132 differs according to whether the medium P has been inserted into the insertion port 10a. That is, the medium P inserted into the insertion port 10a is detectable. Thus, the medium P inserted into the apparatus body 10 is detectable with a novel configuration. Because the light source for detecting the medium P inserted into the insertion port 10a is the light source 12a, a light source for detecting the medium P does not need to be provided separately in the insertion port 10a. Further, because the medium P inserted into the insertion port 10a is detectable by the light receiving unit 132 installed at one position, for example, a plurality of sensors do not need to be provided along the width direction. Accordingly, the number of parts of the apparatus is reducible, thereby enabling downsizing of the apparatus.

When the control device 133 determines whether the medium P has been inserted into the insertion port 10a, the light receiving unit 132 may detect light output from the light guide and output unit 131 together with ambient light. Therefore, the control device 133 changes the lighting characteristics of the light source 12a to lighting characteristics for detecting the medium and compares the lighting characteristics of the light source 12a for detecting the medium with the detection result of the light receiving unit 132, to determine whether the medium P has been inserted into the insertion port 10a based on the comparison result, thereby enabling to improve the detection accuracy of the medium P inserted into the insertion port 10a. That is, when determining whether the medium P has been inserted into the insertion port 10a, the control device 133 determines whether at least a part of light output from the light guide and output unit 131 is blocked by the medium P in the insertion port 10a, based on a change in the lighting characteristics of the light source 12a detected by the light receiving unit 132, thereby enabling to improve the detection accuracy of the medium P inserted into the insertion port 10a.

Specifically, for example, when the control device 133 determines whether the medium P has been inserted, the control device 133 causes the light source 12a to emit light with lighting characteristics different from that of the ambient light, so that the detection result of the light receiving unit 132 becomes insusceptible to the ambient light. Therefore, the detection accuracy of the medium P inserted into the insertion port 10a is able to be improved further.

Further, the control device 133 is able to improve the detection accuracy of the medium P inserted into the insertion port 10a by considering also the fact that the same consecutive determination results of whether it is the light reception upon emission of light or no light reception upon turning off of the light have been obtained in deciding whether the medium P has been inserted into the insertion port 10a. When the control device 133 determines whether the light-reception count value N is smaller than the threshold X, the detection accuracy of the medium P inserted into the insertion port 10a is able to be improved as the specified number of measurements N0 is set to a larger value. That is, the control device 133 is able to improve the detection accuracy of the medium P inserted into the insertion port 10a by determining whether the medium P has been inserted into the insertion port 10a based on whether the detection result of the light receiving unit 132 is the same as or similar to the lighting characteristics of the light source 12a.

When the control device 133 determines whether the medium P has been inserted into the insertion port 10a, because the light source 12a is operated intermittently, power consumption of the light source 12a at the time of determination is reducible.

Figure 8:
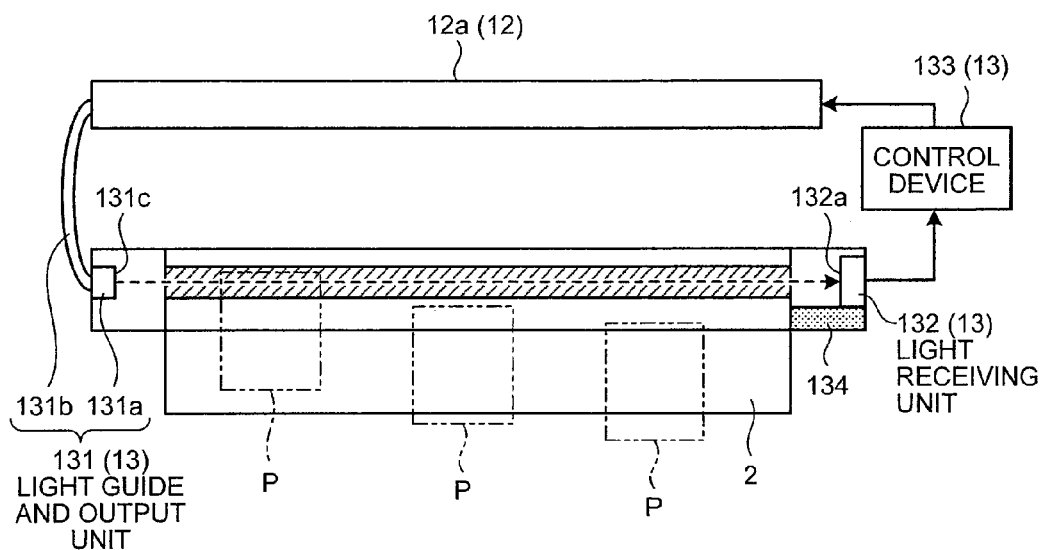
FIG. 8 is a top view of important parts of an image reading apparatus according to a second embodiment of the present invention.

An image reading apparatus according to a second embodiment of the present invention is explained next. FIG. 8 is a top view of important parts of the image reading apparatus according to the second embodiment. The image reading apparatus 1 according to the second embodiment is characterized in that it includes an ambient-light blocking member 134 for preventing ambient light from entering into the light receiving surface 132a of the light receiving unit 132. Apart from the above feature, the basic configuration of the image reading apparatus 1 according to the second embodiment is identical to that of the image reading apparatus 1 according to the first embodiment, and therefore explanations thereof will be omitted.

The light receiving unit 132 according to the second embodiment is provided inside the insertion port 10a. The light receiving unit 132 according to the second embodiment is provided inside the insertion port 10a at the other end in the width direction.

The ambient-light blocking member 134 is provided upstream in an inserting direction with respect to the light receiving surface 132a of the light receiving unit 132. The inserting direction is a direction in which the medium P is inserted into the insertion port 10a. The ambient-light blocking member 134 does not transmit at least light having a wavelength within a wavelength range of the ambient light. In the second embodiment, the ambient-light blocking member 134 is wall-shaped to block the ambient light.

Accordingly, in the second embodiment, in the region through which the light passes, one beam of light emitted from the light outputting unit 131a crosses between the one end and the other end of the insertion port 10a along the width direction. That is, the region through which the light passes in the second embodiment is the same as that of the light in the first embodiment.

In the image reading apparatus 1 according to the second embodiment, because the light receiving unit 132 may detect light emitted from the light guide and output unit 131 together with the ambient light, the light receiving surface 132a of the light receiving unit 132 and the ambient light are isolated from each other by providing the ambient-light blocking member 134 upstream of the light receiving surface 132a of the light receiving unit 132 in the inserting direction. That is, because the detection result of the light receiving unit 132 is not affected by the ambient light, the detection accuracy of the medium P inserted into the insertion port 10a is able to be improved.

Figure 9:
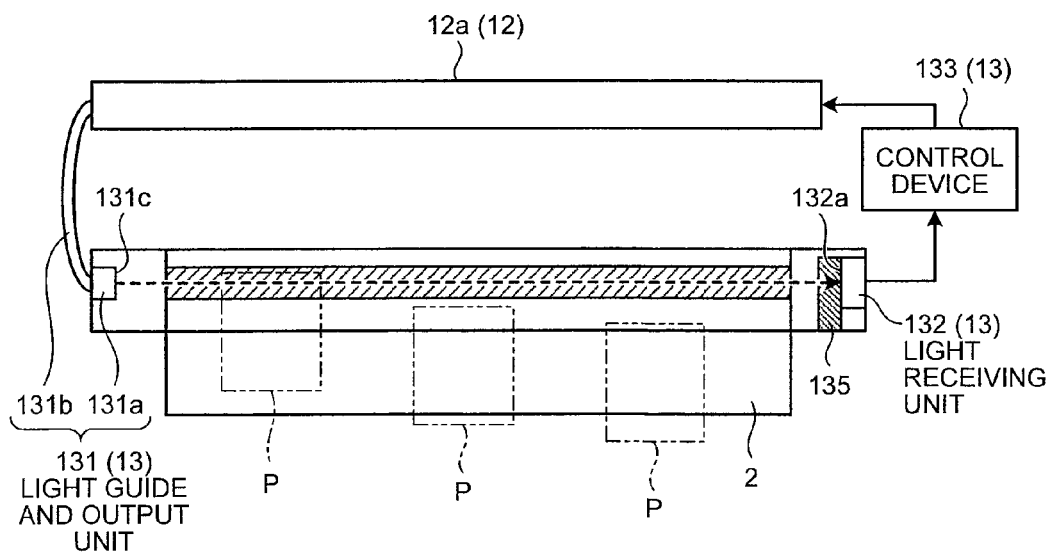
FIG. 9 is a top view of another example of the important parts of the image reading apparatus.

FIG. 9 is a top view of another example of the important parts of the image reading apparatus. The image reading apparatus 1 according to the second embodiment may include an ambient-light removing filter 135 instead of the ambient-light blocking member 134. In the image reading apparatus according to the second embodiment, the light receiving unit 132 is provided in the insertion port 10a, and as in the example illustrated in FIG. 8, the light receiving unit 132 is provided at the other end in the width direction in the insertion port 10a.

The ambient-light removing filter 135 is arranged at the light receiving surface 132a of the light receiving unit 132. The ambient-light removing filter 135 is an optical filter that transmits light output from the light guide and output unit 131 but does not transmit at least light having a wavelength within the wavelength range of the ambient light.

In the another example of the image reading apparatus 1 according to the second embodiment, light output from the light guide and output unit 131 and the ambient light are separated from each other and the light receiving unit 132 detects light from which the ambient light is removed, by arranging the ambient-light removing filter 135 at the light receiving surface 132a of the light receiving unit 132. Also in this case, because the detection result of the light receiving unit 132 is not affected by the ambient light, the detection accuracy of the medium P inserted into the insertion port 10a is able to be improved.

Figure 10:
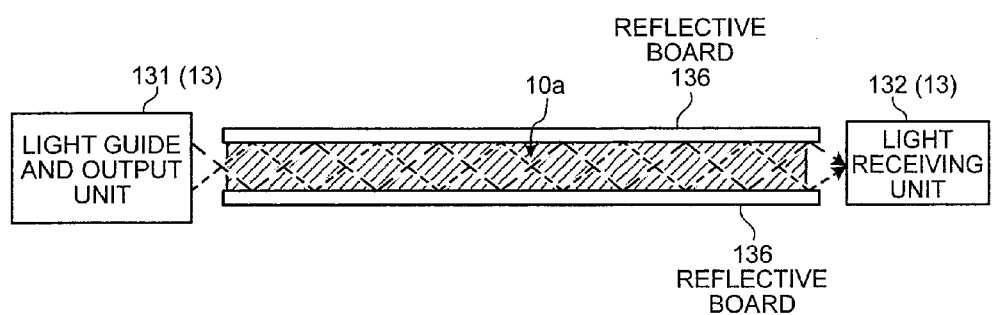
FIG. 10 is a schematic diagram of an image reading apparatus according to a third embodiment.

An image reading apparatus according to a third embodiment of the present invention is explained next. FIG. 10 is a schematic diagram of the image reading apparatus according to the third embodiment. The image reading apparatus 1 according to the third embodiment further includes a pair of reflective boards 136 at both ends of the insertion port 10a in a sheet thickness direction for expanding the region through which light passes in the sheet thickness direction. The sheet thickness direction is a direction orthogonal both to the inserting direction in which the medium P is inserted into insertion port 10a, and to the width direction. Apart from the above feature, the basic configuration of the image reading apparatus 1 according to the third embodiment is identical to that of the image reading apparatus 1 according to the first embodiment, and therefore explanations thereof will be omitted.

The reflective board 136 is a reflecting member. A pair of reflective boards 136 is provided opposite to each other at the both ends in the sheet thickness direction in the insertion port 10a. The pair of reflective boards 136 reflects light incident on their opposite surfaces facing each other. More specifically, the pair of reflective boards 136 is for totally reflecting light incident on the opposite surfaces. In the third embodiment, the total reflection by the pair of reflective boards 136 is simply referred to as reflection.

In the light guide and output unit 131 according to the third embodiment, a plurality of light output positions from which light from the light guide and output unit 131 is output are set in the sheet thickness direction. An optical axis of light output from the light guide and output unit 131 according to the third embodiment intersects with a normal line direction of one of the opposite surfaces of the pair of reflective boards 136, so that the light reflected by the reflective boards 136 is received by the light receiving unit 132. In the third embodiment, two light output positions are set in the light outputting unit 131a, for example. In the third embodiment, one of two optical axes of lights output from the light guide and output unit 131 intersects with the normal line direction of one of the opposite surfaces of the pair of the reflective boards 136. In the third embodiment, the other one of the two optical axes of lights output from the light guide and output unit 131 intersects with the normal line direction of the other one of the opposite surfaces of the pair of the reflective board 136.

With the above configuration, in the third embodiment, in the region through which light passes, light output from the light outputting unit 131a is repeatedly reflected by the pair of reflective boards 136, while proceeding in the width direction, to traverse between one end and the other end of the insertion port 10a.

In the image reading apparatus 1 according to the third embodiment, light output from the light guide and output unit 131 is reflected at least once by the pair of reflective boards 136 at the time of passing inside the insertion port 10a and reaches the light receiving unit 132. In the insertion port 10a, because light output from the light guide and output unit 131 reaches the light receiving unit 132 while moving not only in the width direction but also in the sheet thickness direction, even if there is variation in the position of the medium P inserted into the insertion port 10a in the sheet thickness direction, at least a part of light output from the light guide and output unit 131 is blocked by the medium P inserted into the insertion port 10a, and light received by the light receiving unit 132 changes, as compared with a case in which the medium P is not inserted into the insertion port 10a. Specifically, for example, the amount of light received by the light receiving unit 132 decreases. That is, even if there is variation in the position of the medium P inserted into the insertion port 10a in the sheet thickness direction, the medium P inserted into the insertion port 10a is detectable.

In the image reading apparatus 1 according to the third embodiment, as an incident angle and a reflection angle with respect to the reflecting surface of the reflective board 136 becomes smaller, intervals in the width direction between reflecting positions of light on a reflecting surface of the reflective board 136 are able to be shortened. Therefore, the intervals in the width direction between the reflecting positions of light on the reflecting surface of the reflective board 136 are able to be shortened by making the optical axis of light output from the light guide and output unit 131 according to the third embodiment cross the normal line direction of one of the opposite surfaces of the pair of reflective boards 136 such that an angle formed therebetween decreases such that the light reflected by the pair of light reflective boards 136 is received by the light receiving unit 132. Therefore, the image reading apparatus 1 is able to detect the medium P, even if the medium P having a relatively narrow width in the width direction is inserted into the insertion port 10a.

In the image reading apparatus 1 according to the third embodiment, if the angle formed between the optical axis of light output from the light guide and output unit 131 and the normal line direction of the opposite surface of the reflective board 136 is made different for each light output from the light guide and output unit 131, the light output from the light guide and output unit 131 is reflected at various positions in the width direction of the insertion port 10a, and the position of the medium P inserted into the insertion port 10a is detectable, even if the position of the medium P inserted into the insertion port 10a varies not only in the width direction but also in the sheet thickness direction. That is, in this case, the detection accuracy of the medium P inserted into the insertion port 10a is able to be improved.

In the image reading apparatus 1 according to the third embodiment, the light guide and output unit 131 outputs a plurality of beams of light, but the light guide and output unit 131 may emit one beam of light. Even in this case, the image reading apparatus 1 according to the third embodiment is able to detect the medium P inserted into the insertion port 10a.

Figure 11:
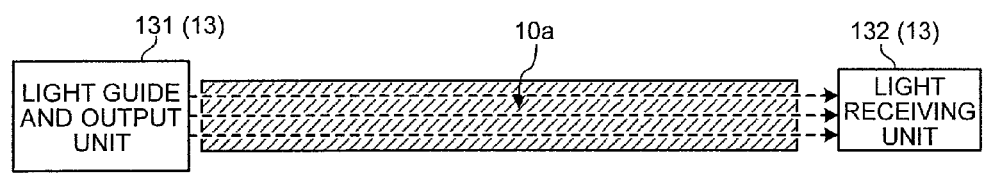
FIG. 11 is a schematic diagram of an image reading apparatus according to a fourth embodiment.

An image reading apparatus according to a fourth embodiment of the present invention is explained next. FIG. 11 is a schematic diagram of the image reading apparatus according to the fourth embodiment. In the image reading apparatus 1 according to the fourth embodiment, a plurality of light passing regions are formed in the sheet thickness direction to correspond to variation in the position of the medium P inserted into the insertion port 10a in the sheet thickness direction. Apart from the above feature, the basic configuration of the image reading apparatus 1 according to the fourth embodiment is identical to that of the image reading apparatus 1 according to the first embodiment, and therefore explanations thereof will be omitted.

In the light guide and output unit 131 according to the fourth embodiment, a plurality of light emitting positions from which light from the light guide and output unit 131 is output are set in the sheet thickness direction. In the fourth embodiment, three light emitting positions are set in the light outputting unit 131a, for example.

In the light receiving unit 132 according to the fourth embodiment, a plurality of light receiving positions at which light output from the light guide and output unit 131 is received are set in the sheet thickness direction, correspondingly with the plurality of light emitting positions set in the light guide and output unit 131. In the fourth embodiment, three light receiving positions are set in the light receiving unit 132, for example.

With the above configuration, in the fourth embodiment, in the light passing regions, a plurality of beams of light output from the light outputting unit 131a traverse between one end and the other end of the insertion port 10a along the width direction, parallel to each other in the sheet thickness direction. That is, in the light passing regions in the fourth embodiment, the light passing region in the first embodiment is plurally present in the sheet thickness direction.

In the image reading apparatus 1 according to the fourth embodiment, in the insertion port 10a, the light emitted from the light source 12a is output from the plurality of light output positions in the sheet thickness position of the light guide and output unit 131, and is received at the plurality of light receiving positions in the sheet thickness direction of the light receiving unit 132. That is, a plurality of regions through which the light output from the light guide and output unit 131 passes exist in the insertion port 10a in the sheet thickness direction. Therefore, even if there is variation in the position of the medium P inserted into the insertion port 10a in the sheet thickness direction, at least a part of light output from the light guide and output unit 131 is blocked by the medium P inserted into the insertion port 10a, and the light received by the light receiving unit 132 changes. Specifically, even if there is variation in the position of the medium P inserted into the insertion port 10a in the sheet thickness direction, at least a part of the light output from the light guide and output unit 131 is blocked by the medium P inserted into the insertion port 10a, and the amount of light received at the light receiving unit 132 is reducible. That is, even if there is variation in the position of the medium P inserted into the insertion port 10a in the sheet thickness direction, the medium P inserted into the insertion port 10a is detectable.

Further, in the image reading apparatus 1 according to the fourth embodiment, even if the size of the insertion port 10a in the sheet thickness direction is relatively large, because a plurality of light passing regions are present in the sheet thickness direction, the medium P inserted into the insertion port 10a is detectable, even if there is variation in the position of the medium P inserted into the insertion port 10a in the sheet thickness direction. Accordingly, the image reading apparatus 1 according to the fourth embodiment is able to improve the detection accuracy of the medium P inserted into the insertion port 10a.

Figure 12:
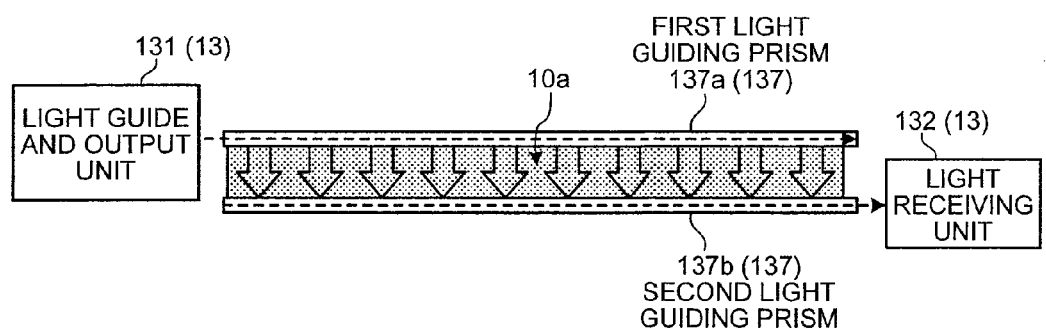
FIG. 12 is a schematic diagram of an image reading apparatus according to a fifth embodiment.

An image reading apparatus according to a fifth embodiment of the present invention is explained next. FIG. 12 is a schematic diagram of the image reading apparatus according to the fifth embodiment. The image reading apparatus 1 according to the fifth embodiment is characterized in that the light passing region is the entire opening of the insertion port 10a as viewed from the front, to increase the detection accuracy of the medium P inserted into the insertion port 10a. Apart from the above feature, the basic configuration of the image reading apparatus 1 according to the fifth embodiment is identical to that of the image reading apparatus 1 according to the first embodiment, and therefore explanations thereof will be omitted.

The image reading apparatus 1 according to the fifth embodiment further includes a pair of light guiding prisms 137. A pair of light guiding prisms 137 includes a first light guiding prism 137a and a second light guiding prism 137b.

The first light guiding prism 137a is a first photorefractive member. The first light guiding prism 137a is provided at one end in the sheet thickness direction in the insertion port 10a. The first light guiding prism 137a is optically connected to the light guide and output unit 131. The first light guiding prism 137a receives the light output from the light guide and output unit 131 and refracts and outputs the received light to the inside of the insertion port 10a from a plurality of positions in the width direction. In the fifth embodiment, the first light guiding prism 137a guides and diffuses the light output from the light guide and output unit 131 along the width direction and outputs the diffused light toward the second light guiding prism 137b.

The second light guiding prism 137b is a second photorefractive member. The second light guiding prism 137b is provided opposite to the first light guiding prism 137a at the other end in the sheet thickness direction in the insertion port 10a. The second light guiding prism 137b is optically connected to the light receiving unit 132. The second light guiding prism 137b receives the light having passed through the insertion port 10a, refracts and converges the received light, and then outputs the converged light to the light receiving unit 132.

With the above configuration, in the fifth embodiment, the light passing region includes the insides of the first light guiding prism 137a and the second light guiding prism 137b, and is the entire opening of the insertion port 10a as viewed from the front.

In the image reading apparatus 1 according to the fifth embodiment, when the medium P is not inserted into the insertion port 10a of the apparatus body 10, light emitted from the light source 12a passes between the first light guiding prism 137a and the second light guiding prism 137b via the light guide and output unit 131 and the first light guiding prism 137a, and is received by the light receiving unit 132 via the second light guiding prism 137b. That is, the passing region of the light output from the light guide and output unit 131 in the insertion port 10a is present from one end to the other end of the insertion port 10a in the sheet thickness direction. Therefore, even if there is variation in the position of the medium P inserted into the insertion port 10a in the sheet thickness direction, at least a part of light output from the light guide and output unit 131 is blocked by the medium P inserted into the insertion port 10a, and light received by the light receiving unit 132 changes, as compared with a case in which the medium P is not inserted into the insertion port 10a. Specifically, for example, the amount of light received in the light receiving unit 132 decreases. That is, even if there is variation in the position of the medium P inserted into the insertion port 10a in the sheet thickness direction, the medium P inserted into the insertion port 10a is detectable.

In the insertion port 10a, because diffused light is output from the first light guiding prism 137a toward the second light guiding prism 137b, when the medium P is not inserted into the insertion port 10a, the entire inside of the insertion port 10a becomes the light passing region. Therefore, when the medium P is inserted into the insertion port 10a, the medium P blocks at least a part of light passing through the entire insertion port 10a. Accordingly, the light received by the light receiving unit 132 changes infallibly, as compared with a case in which the medium P is not inserted into the insertion port 10a. Specifically, for example, the amount of light received by the light receiving unit 132 decreases infallibly. That is, the detection accuracy of the medium P inserted into the insertion port 10a is able to be improved.

Figure 13:
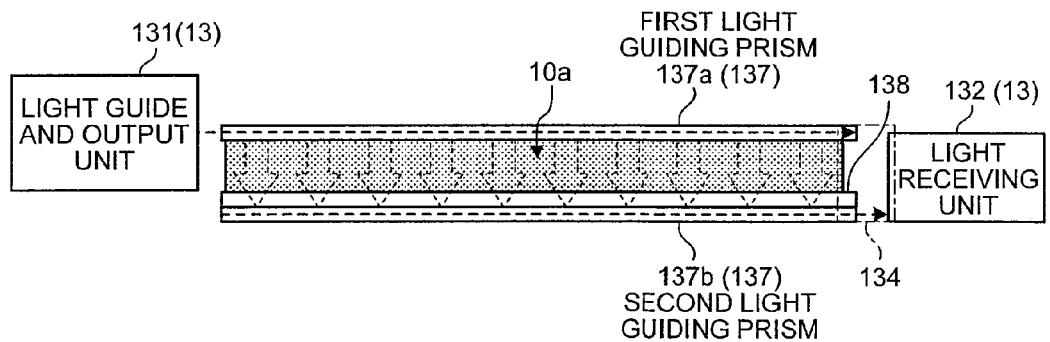
FIG. 13 is a schematic diagram of an image reading apparatus according to a sixth embodiment.

An image reading apparatus according to a sixth embodiment of the present invention is explained next. FIG. 13 is a schematic diagram of the image reading apparatus according to the sixth embodiment. As illustrated in FIG. 13, the image reading apparatus 1 according to the sixth embodiment is characterized in that it further includes an ambient-light removing filter 138 and the ambient-light blocking member 134 for preventing ambient light from reaching the second light guiding prism 137b and the light receiving surface 132a of the light receiving unit 132 with respect to the image reading apparatus 1 according to the fifth embodiment. Because an installation position and the like of the ambient-light blocking member 134 are the same as those of the ambient-light blocking member 134 according to the second embodiment, explanations thereof will be omitted. Further, because the light passing region in the image reading apparatus 1 according to the sixth embodiment is the same as that in the image reading apparatus 1 according to the fifth embodiment, explanations thereof will be omitted. Furthermore, the basic configuration of the image reading apparatus 1 according to the sixth embodiment is identical to that of the image reading apparatus 1 according to the first embodiment, and therefore explanations thereof will be omitted.

The ambient-light removing filter 138 is arranged on an incidence plane, which is the surface of the second light guiding prism 137b on the first light guiding prism 137a side, to cover the incidence plane of the second light guiding prism 137b. The ambient-light removing filter 138 is an optical filter that transmits light output from the first light guiding prism 137a but does not transmit at least light having a wavelength within the wavelength range of ambient light.

In the image reading apparatus 1 according to the sixth embodiment, the ambient-light removing filter 138 is arranged on the incidence plane of the second light guiding prism 137b and the ambient-light blocking member 134 is provided upstream of the light receiving surface 132a of the light receiving unit 132 in the inserting direction, to separate the light output from the light guide and output unit 131 from the ambient light and shield the light receiving surface 132a of the light receiving unit 132 from the ambient light. That is, because the detection result of the light receiving unit 132 is not affected by the ambient light, the detection accuracy of the medium P inserted into the insertion port 10a is able to be further improved.

The image reading apparatus 1 according to the sixth embodiment includes the ambient-light removing filter 138 and the ambient-light blocking member 134, but it may include either one of the ambient-light removing filter 138 and the ambient-light blocking member 134. In this case, the image reading apparatus 1 according to the sixth embodiment performs either separation between the light output from the light guide and output unit 131 and the ambient light or shielding of the light receiving surface 132a of the light receiving unit 132 from the ambient light. Therefore, the influence of the ambient light is suppressed in the detection result of the light receiving unit 132. Accordingly, also in this case, the detection accuracy of the medium P inserted into the insertion port 10a is able to be improved.

Further, the image reading apparatus 1 according to the sixth embodiment includes the ambient-light blocking member 134, but it may include the ambient-light removing filter 135 explained in the second embodiment instead of the ambient-light blocking member 134, and the ambient-light removing filter 135 may be arranged at the light receiving surface 132a of the light receiving unit 132. In this case, because the detection result of the light receiving unit 132 is not affected by the ambient light, the detection accuracy of the medium P inserted into the insertion port 10a is able to be further improved.

Figure 14A:
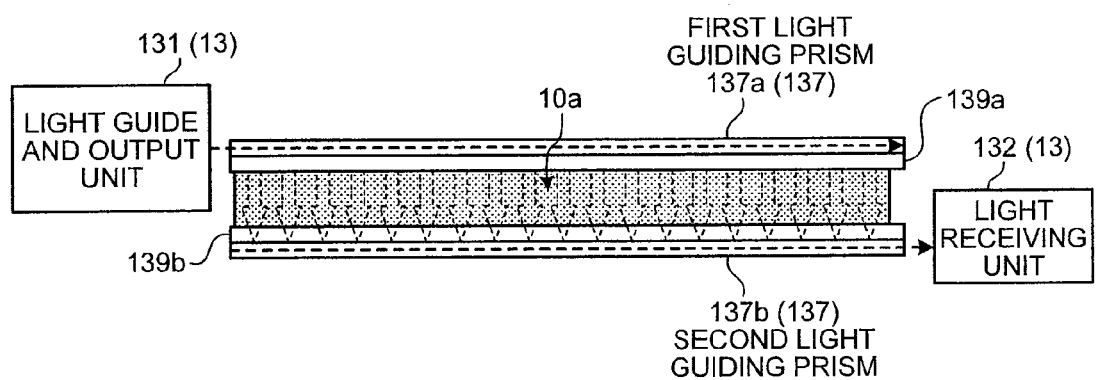
FIGS. 14A and 14B are schematic diagrams of an image reading apparatus according to a seventh embodiment.
Figure 14B:
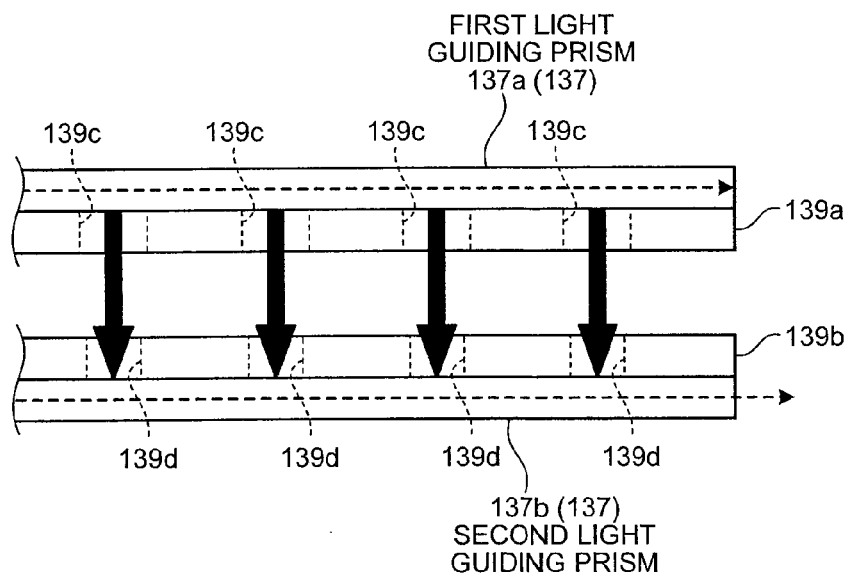

An image reading apparatus according to a seventh embodiment of the present invention is explained next. FIGS. 14A and 14B are schematic diagrams of the image reading apparatus according to the seventh embodiment. FIG. 14A is a front view of the outline of the image reading apparatus 1, and FIG. 14B is an enlarged front view of important parts of the image reading apparatus 1. As illustrated in FIGS. 14A and 14B, the image reading apparatus 1 according to the seventh embodiment includes an exit slit plate 139a and an entrance slit plate 139b for preventing flare light reflected by the medium P from entering into the second light guiding prism 137b, with respect to the image reading apparatus 1 according to the fifth embodiment. Apart from the above feature, the basic configuration of the image reading apparatus 1 according to the seventh embodiment is identical to that of the image reading apparatus 1 according to the first embodiment, and therefore explanations thereof will be omitted.

The exit slit plate 139a is arranged on an exit surface, which is a surface of the first light guiding prism 137a on the second light guiding prism 137b side, to cover the entire exit surface of the first light guiding prism 137a. The exit slit plate 139a includes a plurality of exit slits 139c formed side by side in the width direction. The exit slits 139c output light scattered by the first light guiding prism 137a from the first light guiding prism 137a toward the second light guiding prism 137b. In the seventh embodiment, the exit slits 139c are formed in the exit slit plate 139a at regular intervals in the width direction.

The entrance slit plate 139b is arranged on the incidence plane of the second light guiding prism 137b, to cover the entire incidence plane of the second light guiding prism 137b. The entrance slit plate 139b includes a plurality of entrance slits 139d formed side by side in the width direction. The entrance slits 139d are formed correspondingly with the exit slits 139c formed in the exit slit plate 139a. That is, the number of the entrance slits 139d formed in the entrance slit plate 139b are the same as that of the exit slits 139c in the exit slit plate 139a. The entrance slits 139d face the corresponding exit slits 139c in the sheet thickness direction. In the seventh embodiment, the entrance slits 139d are formed in the entrance slit plate 139b at regular intervals in the width direction, facing the exit slits 139c in the sheet thickness direction. Light output from the first light guiding prism 137a via the exit slits 139c in the exit slit plate 139a passes through the insertion port 10a along the sheet thickness direction, and reaches the second light guiding prism 137b via the entrance slits 139d in the entrance slit plate 139b.

With the above configuration, the light passing region in the image reading apparatus 1 according to the seventh embodiment is a combination of the insides of the first light guiding prism 137a and the second light guiding prism 137b and that where a plurality of beams of light output from the first light guiding prism 137a traverse along the sheet thickness direction between the exit surface of the first light guiding prism 137a and the incidence plane of the second light guiding prism 137b parallel to each other in the width direction. That is, also in the image reading apparatus 1 according to the seventh embodiment, the light passing region is present from one end to the other end of the insertion port 10a in the width direction.

In the image reading apparatus 1 according to the seventh embodiment, because the exit slit plate 139a is arranged at the exit plane of the first light guiding prism 137a and the entrance slit plate 139b is arranged at the incidence plane of the second light guiding prism 137b, the light output from the light guide and output unit 131 passes through the exit slits 139c and the entrance slits 139d via the first light guiding prism 137a, and enters the light receiving unit 132 via the second light guiding prism 137b. That is, the light receiving unit 132 detects the light having passed through the exit slits 139c and the entrance slits 139d.

In the image reading apparatus 1 according to the seventh embodiment, because the amount of light output from the first light guiding prism 137a is narrowed down by the exit slit plate 139a, light irradiated to the medium P inserted into the insertion port 10a is prevented from being too much. Therefore, generation of flare light by the medium P inserted into the insertion port 10a is suppressible.

Further, because the entrance slit plate 139b is able to prevent flare light or ambient light generated by the medium P from entering the second light guiding prism 137b, flare light or ambient light generated by the medium P is prevented from being included in the light passing through the entrance slits 139d, that is, in the light detected by the light receiving unit 132 via the second light guiding prism 137b. Accordingly, the detection accuracy of the medium P is able to be improved.

That is, in the detection result of the light receiving unit 132, the influence of flare light or ambient light generated by the medium P is suppressed by the exit slit plate 139a and the entrance slit plate 139b. Therefore, the detection accuracy of the medium P inserted into the insertion port 10a is able to be further improved.

The image reading apparatus 1 according to the seventh embodiment includes the exit slit plate 139a and the entrance slit plate 139b, but is may include either one of the exit slit plate 139a and the entrance slit plate 139b. In this case, the image reading apparatus 1 according to the seventh embodiment suppresses generation of flare light by the medium P or prevents flare light and prevents ambient light generated by the medium P from being detected by the light receiving unit 132. Accordingly, also in this case, in the detection result of the light receiving unit 132, the influence of flare light or ambient light is suppressed, and thus the detection accuracy of the medium P inserted into the insertion port 10a is able to be further improved.

In the image reading apparatus 1 according to the seventh embodiment, the exit slits 139c and entrance slits 139d are respectively formed in the width direction at regular intervals, but the present invention is not limited thereto. The exit slits 139c and the entrance slits 139d may not be formed at regular intervals in the width direction, and may be arranged in the width direction to face each other in the sheet thickness direction. In this case, the image reading apparatus 1 according to the seventh embodiment suppresses generation of flare light by the medium P, and prevents flare light or ambient light generated by the medium P from being detected by the light receiving unit 132. Accordingly, also in this case, in the detection result of the light receiving unit 132, the influence of flare light or ambient light is suppressed, and thus the detection accuracy of the medium P inserted into the insertion port 10a is able to be further improved.

While the first to seventh embodiments have been explained above, in the image reading apparatus 1 according to these embodiments, the light guide and output unit 131 and the light receiving unit 132 may be provided together at one end of the insertion port 10a in the width direction and a reflection mirror may be provided at the other end of the insertion port 10a in the width direction. That is, light may be emitted from one end of the insertion port 10a in the width direction, the emitted light may traverse the inside of the insertion port 10a in the width direction and reflected by the reflection mirror at the other end of the insertion port 10a in the width direction, and the reflected light may traverse the inside of the insertion port 10a in the width direction again (however, the direction of light is opposite), and may be received by the light receiving unit 132 at the one end of the insertion port 10a in the width direction.

While the first to seventh embodiments have been explained above, in the image reading apparatus 1 according to these embodiments, the light source 12a may emit light without changing the lighting characteristics of the light source 12a to the lighting characteristics for detecting the medium by the control device 133. Also in this case, the image reading apparatus 1 according to the first to seventh embodiments is able to detect the medium P inserted into the insertion port 10a.

In the image reading apparatus 1 according to the first to seventh embodiments, while the existing light source is the light source 12a provided in the imaging unit 12, the existing light source may be an indicator lamp or a pilot lamp provided in the apparatus body 10.

Further, the image reading apparatus 1 according to the third to fifth and seventh embodiments may further include the ambient-light blocking member 134 explained in the second embodiment, and the ambient-light blocking member 134 may be provided upstream of the light receiving surface 132a of the light receiving unit 132 in the inserting direction. Furthermore, the image reading apparatus 1 according to the third to fifth and seventh embodiments may include the ambient-light removing filter 135 explained in the second embodiment instead of the ambient-light blocking member 134, and the ambient-light removing filter 135 may be arranged ay the light receiving surface 132a of the light receiving unit 132. In these cases, because the detection result of the light receiving unit 132 is not affected by the ambient light, the detection accuracy of the medium P inserted into the insertion port 10a is able to be further improved.

When the sheet medium is inserted into the insertion port of the apparatus body, in the insertion port, at least a part of light output from the light guide and output unit is blocked by the sheet medium and a change occurs in the light received by the light receiving unit. Therefore, the determining unit is able to detect the sheet medium inserted into the insertion port based on the change of light received by the light receiving unit. Thus, the sheet medium inserted into the apparatus body is detectable with the above novel structure. Further, because the sheet medium inserted into the insertion port is detected by using the existing light source, a light source for detecting the sheet medium does not need to be provided separately. Furthermore, because the sheet medium is detectable by the light receiving unit installed at one location, the number of parts of the apparatus is reduced, thereby enabling to downsize the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus, comprising:
an apparatus body including an insertion port into which a sheet medium is insertable;
a light source provided in the apparatus body and configured to emit light for reading an image on the sheet medium inserted into the insertion port;
a light guide and output unit optically connected to the light source and configured to guide the light emitted from the light source and output the guided light into the insertion port;
a light receiving unit configured to detect the light output from the light guide and output unit; and
a determining unit configured to determine whether the sheet medium is inserted into the insertion port based on a detection result by the light receiving unit, wherein
the light source is configured to emit the light when the determining unit determines whether the sheet medium is inserted into the insertion port, the insertion port includes a region through which the light output from the light guide and output unit passes, the region extending from one end to the other end of the insertion port in a width direction, the width direction being a longitudinal direction of the insertion port, the light guide and output unit is configured to output the light emitted from the light source from the one end of the insertion port in the width direction, the light receiving unit is configured to detect the light output from the light guide and output unit at the other end of the insertion port in the width direction, the image reading apparatus further comprises a pair of light reflecting members provided opposite to each other in a sheet thickness direction orthogonal both to (i) an inserting direction of the sheet medium into the insertion port and to (ii) the width direction, the pair of light reflecting members is configured to reflect light incident on opposite surfaces of the pair of light reflecting members, and an optical axis of the light output from the light guide and output unit is configured to intersect with a normal line direction of one of the opposite surfaces of the pair of light reflecting members, so that the light reflected by the pair of light reflecting members is received by the light receiving unit.

2. An image reading apparatus, comprising:

an apparatus body including an insertion port into which a sheet medium is insertable;

a light source provided in the apparatus body and configured to emit light for reading an image on the sheet medium inserted into the insertion port;

a light guide and output unit optically connected to the light source and configured to guide the light emitted from the light source and output the guided light into the insertion port;

a light receiving unit configured to detect the light output from the light guide and output unit; and a determining unit configured to determine whether the sheet medium is inserted into the insertion port based on a detection result by the light receiving unit, wherein the light source is configured to emit the light when the determining unit determines whether the sheet medium is inserted into the insertion port, the insertion port includes a region through which the light output from the light guide and output unit passes, the region extending from one end to the other end of the insertion port in a width direction, the width direction being a longitudinal direction of the insertion port, the light guide and output unit is configured to output the light emitted from the light source from the one end of the insertion port in the width direction, the light receiving unit is configured to detect the light output from the light guide and output unit at the other end of the insertion port in the width direction, in the light guide and output unit, a plurality of light output positions from which the light from the light guide and output unit is output is set in a sheet thickness direction orthogonal both to (i) an inserting direction of the sheet medium into the insertion port and to (ii) the width direction, and in the light receiving unit, a plurality of light receiving positions at which the light output from the light guide and output unit is received is set in the sheet thickness direction, correspondingly with the plurality of light output positions set in the light guide and output unit.

3. The image reading apparatus according to claim 2, wherein the light receiving unit is configured to detect lighting characteristics of the light source based on the detected light, and the determining unit is configured to compare the lighting characteristics of the light source with the detection result by the light receiving unit and determine whether the sheet medium is inserted into the insertion port based on a result of the comparison.

4. The image reading apparatus according to claim 3, further comprising a lighting control device configured to change the lighting characteristics of the light source when the determining unit determines whether the sheet medium is inserted, wherein the lighting control device is configured to control the light source to emit the light with the lighting characteristics different from characteristics of ambient light, when the determining unit determines whether the sheet medium is inserted.

5. The image reading apparatus according to claim 2, wherein the light receiving unit is provided inside the insertion port, and the image reading apparatus further comprises an ambient-light blocking member provided upstream in the inserting direction with respect to a light receiving surface of the light receiving unit and configured to block at least light having a wavelength within a wavelength range of ambient light.

6. The image reading apparatus according to claim 2, wherein the light receiving unit is provided inside the insertion port, and the image reading apparatus further comprises an ambient-light removing filter provided at a light receiving surface of the light receiving unit and configured to transmit the light output from the light guide and output unit without transmitting at least light having a wavelength within a wavelength range of ambient light.

7. The image reading apparatus according to claim 2, wherein the light source is configured to intermittently operate when the determining unit determines whether the sheet medium is inserted.

8. An image reading apparatus, comprising:

an apparatus body including an insertion port into which a sheet medium is insertable;

a light source provided in the apparatus body and configured to emit light for reading an image on the sheet medium inserted into the insertion port;

a light guide and output unit optically connected to the light source and configured to guide the light emitted from the light source and output the guided light into the insertion port;

a light receiving unit configured to detect the light output from the light guide and output unit;

a determining unit configured to determine whether the sheet medium is inserted into the insertion port based on a detection result by the light receiving unit; and a first light refracting member and a second light refracting member opposite each other in a sheet thickness direction orthogonal both to (i) an inserting direction of the sheet medium into the insertion port and to (ii) a width direction which is a longitudinal direction of the insertion port, wherein the first light refracting member is optically connected to the light guide and output unit and configured to receive the light output from the light guide and output unit, refract the received light, and output the refracted light to an inside of the insertion port from a plurality of positions in the width direction; and the second light refracting member is optically connected to the light receiving unit, and configured to receive light passed inside the insertion port, converge the received light by refracting the received light, and output the converged light to the light receiving unit, the light source is configured to emit the light when the determining unit determines whether the sheet medium is inserted into the insertion port, and the insertion port includes a region through which the light output from the light guide and output unit passes, the region extends from one end to the other end of the insertion port in the width direction.

9. The image reading apparatus according to claim 8, wherein the first light refracting member is configured to guide and diffuse the light output from the light guide and output unit along the width direction, and output the diffused light toward the second light refracting member.

* * * * *